United States Patent [19]
Panahi et al.

[11] Patent Number: 6,069,808
[45] Date of Patent: May 30, 2000

[54] SYMMETRICAL SPACE VECTOR PWM DC-AC CONVERTER CONTROLLER

[75] Inventors: Issa Mahboobi S. Panahi, Houston, Tex.; Stefan Beierke, Freising, Germany

[73] Assignee: Texas Instruments Incorporated, Dallas, Tex.

[21] Appl. No.: 09/081,738

[22] Filed: May 19, 1998

Related U.S. Application Data

[60] Provisional application No. 60/047,287, May 21, 1997.

[51] Int. Cl.$^7$ ................................................ H02M 3/24
[52] U.S. Cl. .................................................. 363/98
[58] Field of Search ........................................ 363/95, 98

[56] References Cited

U.S. PATENT DOCUMENTS

| | | | |
|---|---|---|---|
| 4,703,245 | 10/1987 | Sakamoto et al. | 318/809 |
| 4,722,042 | 1/1988 | Asano et al. | 363/98 |
| 4,800,478 | 1/1989 | Takahashi | 363/98 |
| 4,847,743 | 7/1989 | Kamiyama | 363/98 |
| 4,994,950 | 2/1991 | Gritter | 363/98 |
| 5,182,701 | 1/1993 | Mochikawa et al. | 363/95 |
| 5,309,349 | 5/1994 | Kwan | 363/98 |
| 5,355,297 | 10/1994 | Kawabata et al. | 363/98 |
| 5,428,283 | 6/1995 | Kalman et al. | 318/729 |
| 5,585,708 | 12/1996 | Richardson et al. | 363/98 |
| 5,619,406 | 4/1997 | Divan et al. | 363/98 |
| 5,625,542 | 4/1997 | Stemmler et al. | 363/98 |
| 5,831,843 | 11/1998 | Lindberg et al. | 363/98 |
| 5,905,643 | 5/1999 | Gopfrich et al. | 363/98 |

OTHER PUBLICATIONS

L. Zhang, et al., "An Efficient Microprocessor–Based Pulse–Width Modulator Using Space Vector Modulation Strategy," IEEE, pp. 91–96, Mar. 1994.

(List continued on next page.)

*Primary Examiner*—Jeffrey Sterrett
*Attorney, Agent, or Firm*—J. Dennis Moore; Wade James Brady, III; Richard L. Donaldson

[57] ABSTRACT

A control apparatus for controlling a three phase load apparatus. The control apparatus includes a voltage source inverter having a first pair of transistors, a second pair of transistors, and a third pair of transistors. Each such pair of transistors is connected serially between the terminals of a voltage source. The activation of a first transistor in each such pair of such transistors is effected by the application thereto of a first activation voltage, a second activation voltage and a third activation voltage, respectively, causing a first phase voltage, a second phase voltage and a third phase voltage, to be applied to a respective one of the three parts of the three-phase load apparatus. The selection and duration of activation of such first transistors during each of a continuing series of equal time periods $T_p$ is symmetrical about the mid-point of each of the time periods, and is represented by six non-zero vectors and two zero vectors. The control apparatus also includes a processor, and a bus coupled to the processor for communicating data between the processor and other control apparatus elements. The control apparatus also includes a counter coupled to the bus for providing a counter value counting from zero up to a value of one half of $T_p$ and then counting down to zero, for each of the equal time periods $T_p$. A compare unit is also included, coupled to the bus, having a plurality of registers for the storage of transition count values corresponding to the transition times between the activations of the first transistors in accordance with predetermined space vectors, for comparing the counter value against the transition count values and providing respective transition timing signals when the counter value is the same as the transition count values. Finally, a state machine is included, coupled to the bus and to the compare unit for generating the first activation voltage, the second activation voltage and the third activation voltage and providing them to the voltage source inverter in response to the respective transition timing signals.

7 Claims, 12 Drawing Sheets

OTHER PUBLICATIONS

Moon–Ho Kang, et al., "Variable Structure Approach for Induction Motor Control—Practical Implementation of DSP," IEEE, pp. 50–55, Mar. 1994.

S. Halasz, et al., "Sinusoidal PWM Techniques with Additional Zero–Sequence Harmonics," IEEE, pp. 85–90, Mar. 1994.

Victor R. Stefanovic, et al., "Space–Vector PWM Voltage Control with Optimized Switching Strategy," IEEE IAS Annual Meeting, pp. 1025–1033, Jan. 1992.

Stoshi Ogasawara, et al., "A Novel PWM Scheme of Voltage Source Inverters Based on Space Vector Theory," Archiv Fur Elektrotechnik 74, pp. 33–41, Sep. 1990.

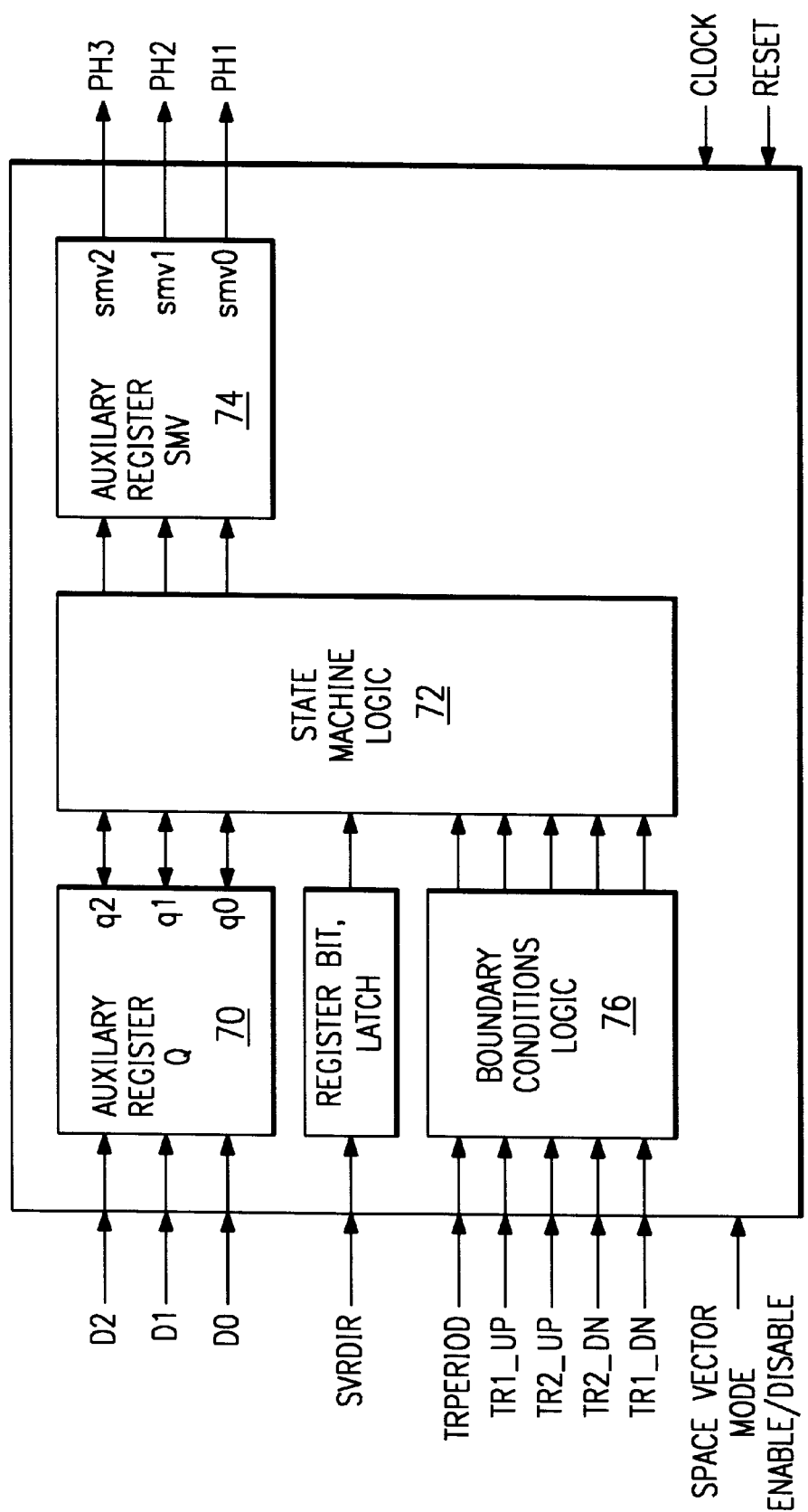

SYMMETRICAL SPACE VECTOR PWM DC-AC CONVERTER CONTROLLER

This application claims priority under 35 USC § 119(e)(1) of provisional application Ser. No. 60/047,287, filed May 21, 1997.

TECHNICAL FIELD OF THE INVENTION

This invention relates to pulse width modulated waveform generation methods and circuits, e.g. for power inverters and motor controllers. More particularly, the invention relates to such methods and circuits utilizing space vectors.

BACKGROUND OF THE INVENTION

Pulse width modulated ("PWM") waveforms are used to turn On and Off the power transistors in a voltage source inverter to control three-phase loads, such as AC motors. The On and Off durations of each transistor correspond to the pulse widths that are applied to the gate or base of the transistor. The On and Off switching of the transistors delivers desired average power and current to the load, e.g., to the AC motor whose current or torque must be controlled. An example of a prior art circuit and method for PWM is shown in U.S. Pat. No. 4,703,245, "Method and Apparatus for Controlling Permanent Magnet Synchronous Motor by Using Pulse Width Modulation," which issued to Sakamoto et al. on Oct. 27, 1987, and was assigned to Fanuc Ltd. This patent relates to a method and apparatus for controlling a permanent magnet synchronous motor, wherein an inverter is controlled in response to PWM signals obtained by comparing a reference carrier wave with signals representing differences between armature winding current command signals of the respective phases and detected armature currents. The arrangement disclosed in this patent is useful to illustrate a basic PWM technique. However, it is an expensive, not integrated solution that uses discrete analog components, various ROM modules and digital to analog converters ("D/As"). It is also aimed at only controlling Permanent Magnet Synchronous motors (or Permanent Magnet Brushless DC motors).

Balanced three phase loads and AC motors typically require ideal sinusoidal current waveforms in each phase. Depending on the PWM generation method that is used, the generated phase current varies from the ideal sinusoidal signal in smoothness, noise and harmonics. Noisy phase currents cause undesired behavior and torque ripples in the operation of the load circuit and motor.

Different modulating schemes, including sinusoidal modulating schemes, may be used to produce PWM waveforms. The common objective of all of these methods is to reduce noise in the load and motor phases, and to increase efficiency of the supply voltage usage in implementing the PWM scheme.

One novel approach that does not use a sinusoidal modulating signal is the space vector PWM method. The space vector PWM method has as its goal the production of an optimal switching pattern of the power transistors such that the phase current noise, i.e., the total harmonic distortion ("THD") is minimized and the output voltage capability of the driver is increased by over 13 percent over sinusoidal modulating schemes.

An example of prior art circuits and methods using the space vector PWM method are shown in U.S. Pat. No. 5,182,701, "Three-Phase PWM Inverter Providing an Improved Output Sinusoidal Waveform," which issued on Jan. 26, 1993, to Mochikawa, et al. and was assigned to Kabushiki Kaisha Toshiba, and in U.S. Pat. No. 5,428,283, "Power Factor Control of Pulse Width Modulated Inverter Supplied Permanent Magnet Motor," which issued on Jun. 27, 1995, to Kalman et al. and was assigned to Alliedsignal Inc.

The '701 patent to Mochikawa et al. relates to an inverter in which six switching elements of an inverter main circuit are controlled to be turned On and Off under a switching pattern in which a voltage space vector composed of adjacent two of six fundamental voltage vectors out of phase from one another by an electrical angle of $\pi/3$ and a zero vector figures a circular locus with the goal of obtaining a three-phase substantially sinusoidal voltage. Two switching patterns of the same kind are to be formed before and after the formation of the switching pattern corresponding to the zero vector. The switching pattern corresponding to the zero vector is to be held for half of its holding time when the voltage space vector passes an intermediate phase position between the two adjacent fundamental voltage vectors.

The method described in '701 patent focuses on switching losses and minimizing torque ripples. It is an independent, not on-chip integration and CPU software intervention, hardware calculator with large memory. Twelve segments are used in one complete rotation, a 360 electrical degree cycle. The wave form symmetry is not discussed, and the switching pattern will be fixed due to hardware realization. The boundary conditions that may occur during operation have not been addressed clearly. The circuit does not include deadband, it takes 2 input commands, phase command and voltage command related to each other, and provides six output signals.

The '283 patent to Kalman et al. relates to power factor control of a pulse width modulated inverter supplied permanent magnet motor by using Park Vectors (space vectors) for automatically adjusting a pulse width modulating signal for approximately unity power factor, with the goal of avoiding manual adjustment during operation of the motor for power factor changes in accordance with changes in EMF and motor resistance. The '283 patent is directed to power control, however, and is mentioned solely for general background purposes.

Space vector ("SV") methods have been implemented by software using digital processors, microcontrollers, and discrete components. See, for example, "A Novel PWM Scheme of Voltage Source Inverters Based on Space Vector Modulation Strategy," by Stoshi Ogasawara, Hirofuni Akagi, et al., Archiv für Elektrotechnik 74, pp 33–41 1990; "An Efficient Microprocessor-Based Pulse-Width Modulator Using Space Vector Modulation Strategy, by L. Zhang, C. Wathanasarn and F. Hardan, IEEE, pp. 91–96, 1994; "Variable Structure Approach for Induction Motor Control—Practical Implementation of DSP, by Moon-Ho Kang, Nam-Jeong Kim, et al., IEEE, pp. 50–55 1994; "Sinusoidal PWM Techniques with Additional Zero-Sequence Harmonics, by S. Halasz, G. Csonka and A. A. M. Hassan, IEEE, pp. 85–90 1994; and "Space-Vector PWM Voltage Control with Optimized Switching Strategy, by V. R. Stefanovic, IEEE IAS Annual Meeting, pp. 1025–1033, 1992.

Implementation of the SV PWM method software on a microcontroller or a digital signal processor ("DSP") requires execution of many instructions. The code size and especially the execution time of the software instructions does not satisfy the design constraints of high performance control systems in many applications. In today's control system designs, carrier frequencies of 25 KHz and higher are used for PWM waveform generation. The SV PWM waveform generation methods require the change of switching states of the power transistors up to four times in every PWM period, which would be 40 $\mu$sec. for a 25 KHz PWM carrier frequency, for example. Furthermore, the change of switching states are commonly driven by interrupt signals. In microprocessors ("MPs"), microcontrollers ("MCUs") and DSPs, there is a certain delay time for the CPU to recognize the occurrence of an interrupt and to put the software program at the beginning of a proper interrupt service routine. This delay time is frequently called the "Interrupt Latency" of the processor. Handling three to four interrupts, with the attendant delay times, and executing many software codes in every PWM period of 40 $\mu$sec. or less makes it a very difficult, and in many applications an impossible task for an MP, an MCU and even a high performance DSP to implement the SV PWM method of waveform generation.

Furthermore, it would be desirable for a Space Vector PWM realization and method to provide software flexibility so that user can optimize the pattern generation according to selected power inverter characteristics, with minimum electrical and acoustic noise that are typically produced in controlling AC motors, and equally distributed power dissipation among the power switches so that switching losses are low, over-stress of transistors are eliminated, and cost per performance is minimized.

Thus, there is a need for an improved SV PWM method to integrate the SV PWM waveform generation on a DSP device that overcomes the difficulties in prior art software implementations of the SV PWM waveform generation methods, and provides reduced system cost, reduced CPU overhead, and at the same time increases system reliability and performance. The present invention provides such a method.

SUMMARY OF THE INVENTION

The present invention provides a control apparatus for controlling a three phase load apparatus. The control apparatus includes a voltage source inverter having a first pair of transistors, a second pair of transistors, and a third pair of transistors. Each such pair of transistors is connected serially between the terminals of a voltage source. The activation of a first transistor in each such pair of such transistors is effected by the application thereto of a first activation voltage, a second activation voltage and a third activation voltage, respectively, causing a first phase voltage, a second phase voltage and a third phase voltage, to be applied to a respective one of the three parts of the three-phase load apparatus. The selection and duration of activation of such first transistors during each of a continuing series of equal time periods $T_p$ is symmetrical about the mid-point of each of the time periods, and is represented by six non-zero vectors and two zero vectors. The control apparatus also includes a processor, and a bus coupled to the processor for communicating data between the processor and other control apparatus elements. The control apparatus also includes a counter coupled to the bus for providing a counter counting from zero up to a value of one half of $T_p$ and then counting down to zero, for each of the equal time periods $T_p$. A compare unit is also included, coupled to the bus, having a plurality of registers for the storage of transition count values corresponding to the transition times between the activations of the first transistors in accordance with predetermined space vectors, for comparing the counter value against the transition count values and providing respective transition timing signals when the counter value is the same as the transition count values. Finally, a state machine is included, coupled to the bus and to the compare unit for generating the first activation voltage, the second activation voltage and the third activation voltage and providing them to the voltage source inverter in response to the respective transition timing signals.

These and other features and advantages of the invention will be apparent to those skilled in the art from the following detailed description of the invention, taken together with the accompanying drawings.

BRIEF DESCRIPTION OF THE DRAWINGS

FIG. 7 is a block diagram of a State Machine that generates the symmetric 4-space vector PWM signals PH1, PH2, and PH3 repeatedly and automatically, when the required input signals are supplied;

DETAILED DESCRIPTION OF THE PREFERRED EMBODIMENTS

Figure 1:
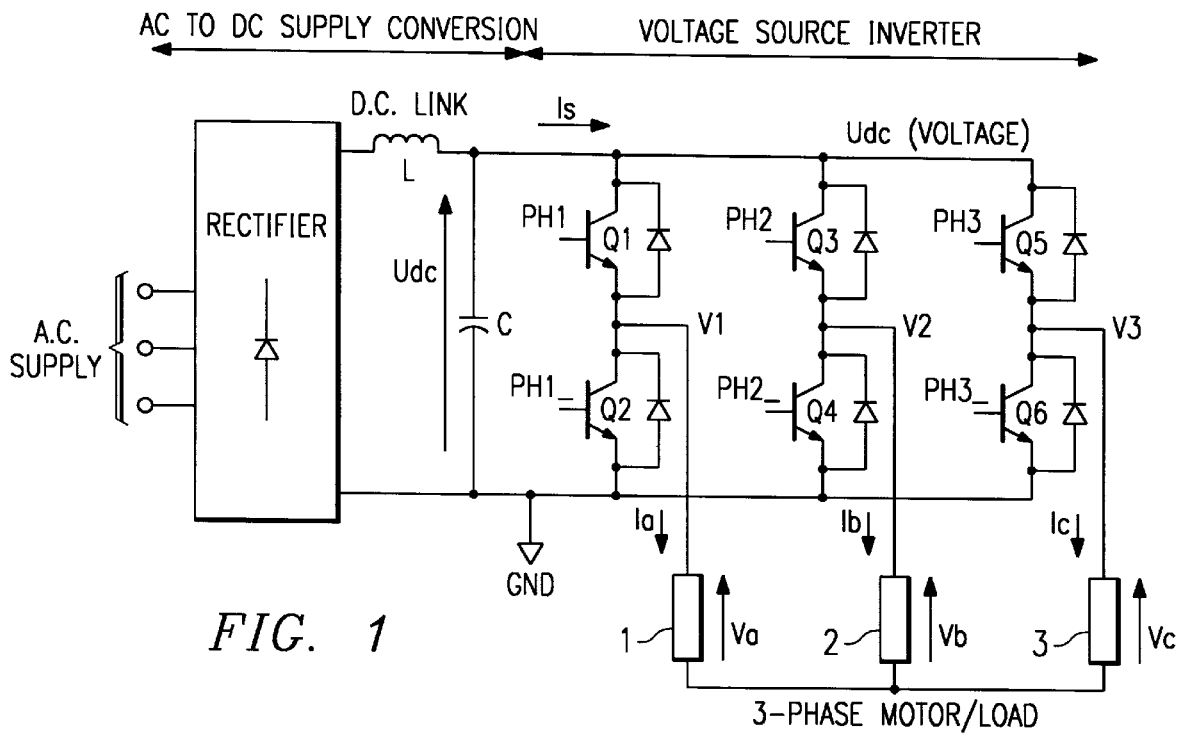
FIG. 1 is a circuit diagram of a three phase voltage source inverter, with an AC to DC power supply link, having a first type of connection to a balanced three phase motor/load.

The symmetric 4-space vector PWM method of the preferred embodiment of the present invention is a special switching pattern technique for a 3-phase voltage source inverter transistors circuit, such as the circuit shown in FIG. 1. It provides optimal sinusoidal currents with minimum harmonic distortion generated on the sections of a three phase load, such as the windings of an AC induction motor. It also provides more efficient use of the voltage supply in comparison with sinusoidal modulation methods.

In FIG. 1 three pairs of switching power transistors (Q1, Q2, and Q3, Q4, and Q5, Q6) are shown. Driving or switching signals are denoted by PHx and PHx_, for x=1,2,3. Note that in this description, an underline symbol, "_", at the end of a term denotes the non-overlapping inverse of the same term without the underline symbol. Thus, PHx_ denotes the non-overlapping inverse of PHx. Currents are denoted by Is, Ia, Ib, and Ic. Line to line phase voltages are denoted by Va, Vb, and Vc. Line to ground voltages are V1, V2, and V3. DC supply voltage to the inverter is denoted by Udc.

General Principles of Operation

Briefly, the general principles of the 4-space vector PWM method of the preferred embodiment of the present invention are as follows. It is assumed that the inverter circuit of FIG. 1 is driving a three phase motor, the voltages at V1, V2 and V3 driving one each of three motor windings 1, 2, 3, respectively. The objective is to estimate the motor voltage vector Uout by a combination of four switching states or switching patterns of the six power transistors Q1–Q6. The input PH_ of one transistor in each leg x (a "leg" is a combined pair of transistors connected between voltage supply Udc and ground GND, e.g., Q1 and Q2), is the inversed PWM pulses of the other input PHx. In every leg x, when the upper transistor is switched on, i.e., PHx=1, the lower transistor is switched off, i.e., PHx_=0. Thus, the On and Off states of the upper transistors Q1, Q3 and Q5 or, equivalently, the states of PHx for x=1, 2, 3, are sufficient to describe the applied motor voltage $U_{OUT}$. When an upper transistor is On, the voltage Vx applied to the corresponding motor winding is almost equal to the voltage supply $U_{dc}$. When an upper transistor is Off, the voltage Vx applied to that winding is close to GND.

The On and Off switchings of the upper transistors Q1, Q3 and Q5 provide eight possible space vectors for the motor voltage. Orthogonal projection of these vectors onto two dimensional coordinates results in six non-zero vectors and two zero vectors. The six non-zero vectors form the axes of a hexagonal. The angle between two adjacent vectors is sixty degrees. The two zero vectors are at the zero coordinates.

Figure 3:
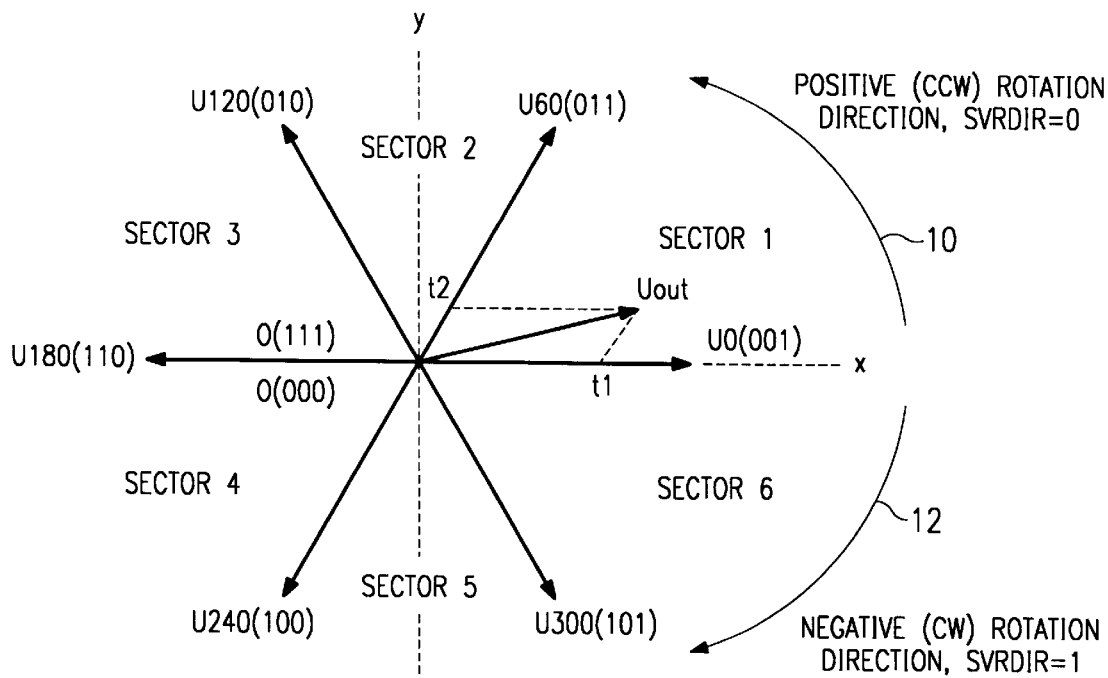
FIG. 3 displays six non-zero and two zero basic vectors and the six sectors divided by six non-zero basic vectors that are 60 degrees apart from each other.

These eight vectors are called the basic space vectors, and are shown in FIG. 3. The six nonzero vectors are denoted U0, U60, U120, U180, U240, U300, and the zero vectors, being essentially points at the origin of the x-y axes, are denoted O(000) and O(111), as shown.

Note that the x-y space is divided into sectors, Sector 1 being delimited by vector U0(001) and vector U60(011), Sector 2 being delimited by vector U60(011) and vector U120(010), Sector 3 being delimited by vector U120(010) and vector U180(110), Sector 4 being delimited by vector U180(110) and vector U240(100), Sector 5 being delimited by vector U240(100) and vector U300(101) and Sector 6 being delimited by vector U300(101) and vector U0(001), all as shown in FIG. 3. Notationally, Ux=Ux(PH3, PH2, PH1), for x=0, 60, 120, 180, 240, 300, and O=O(PH3, PH2, PH1), where PH3=PH2=PH1 (i.e., 0 or 1). For reference, note that arrow 10 denotes the direction of positive, or counter-clockwise ("CCW") rotation for the space vector Uout, while arrow 12 denotes the direction of negative, or clockwise ("CW") rotation for the space vector Uout.

The elements of each basic space vector represent which one of the upper transistors Q1, Q3 and Q5 is On or Off, or, equivalently, which PWM input pulse is high or low. For example, U180(110) means that Q5 is On (PH3=1), Q3 is On (PH2=1) and Q1 is Off (PH1=0). The signal PHx is the control signal determined in accordance with the algorithm that calculates the space vectors, in real time, to drive the transistors of the voltage inverter, and so control the three phase load. The signals PHx are substantially contiguous with one another in time sequence, which is, in general, not desirable.

Due to the intrinsic switching delays of transistors, if these control signals PHx were applied unmodified to the bases of the transistors, the top and bottom transistor in a leg x could be on at the same time for brief periods at the time of transitions, shorting the Ude to GND causing destruction of the power transistors. Accordingly, it is desirable to insert a brief "deadband" at the transitions during which neither transistor in a leg is on, to allow the transistor going from On to Off to complete its switching. The signals PHx are the signals that actually drive the transistors, and are, in general, modified to include the deadband. If there is no deadband, however, then PHx=PHx, and the definition of basic vectors are as follows.

O000=O(PH3=0, PH2=0, PH1=0)=O(000)
O111=O(PH3=1, PH2=1, PH1=1)=O(111)
U0=U0(PH3=0, PH2=0, PH1=1)=UO(001)
U60=U60(PH3=0, PH2=1, PH1=1)=U60(011)
U120=U120(PH3=0, PH2=1, PH1=0)=U120(010)
U180=U180(PH3=1, PH2=1, PH1=0)=U180(110)
U240=U240(PH3=1, PH2=0, PH1=0)=U240(100)
U300=U300(PH3=1, PH2=0, PH1=1)=U300(101)

Note that the binary representations of two adjacent basic vectors are different in one bit only. That is, only one of the upper transistor switches when the basic vector switches between Ux and Ux+60. Note also that the zero vectors O000 and O111 apply no voltage to the motor. The motor voltage vector $U_{OUT}$, at any given time, falls in one of the six sectors. It can thus be estimated linearly by the two adjacent basic vectors of the sector and the two zero basic vectors in every PWM period. For the $U_{OUT}$ shown in FIG. 3, it can thus be written:

$U_{OUT}$=(t1 U0+t2 U60+t0/2 O000+t0/2 O111)/TPWM where the PWM period TPWM is TPWM=t1+t2+t0. The above estimation means that the upper transistors must have the On and Off states represented by U0 and U60 for the time duration of t1 and t2, respectively, in a PWM period, in order to apply a motor voltage equal to $U_{OUT}$.

FIGS. 8a and 8b through 13a and 13b show the control signals PH1, PH2, PH3, for the respective motor phase voltages V1, V2, V3 (FIG. 1), corresponding to each basic vector, for one PWM period, where PHx is equal to PHx, that is, assuming that no deadband is applied. These figures show how the three symmetric 4-space vector PWM waveforms are generated and what they look like in every sector for both CW and CCW directions of rotation, SVRDIR=1, and SVRDIR=0, respectively.

Figure 8A:
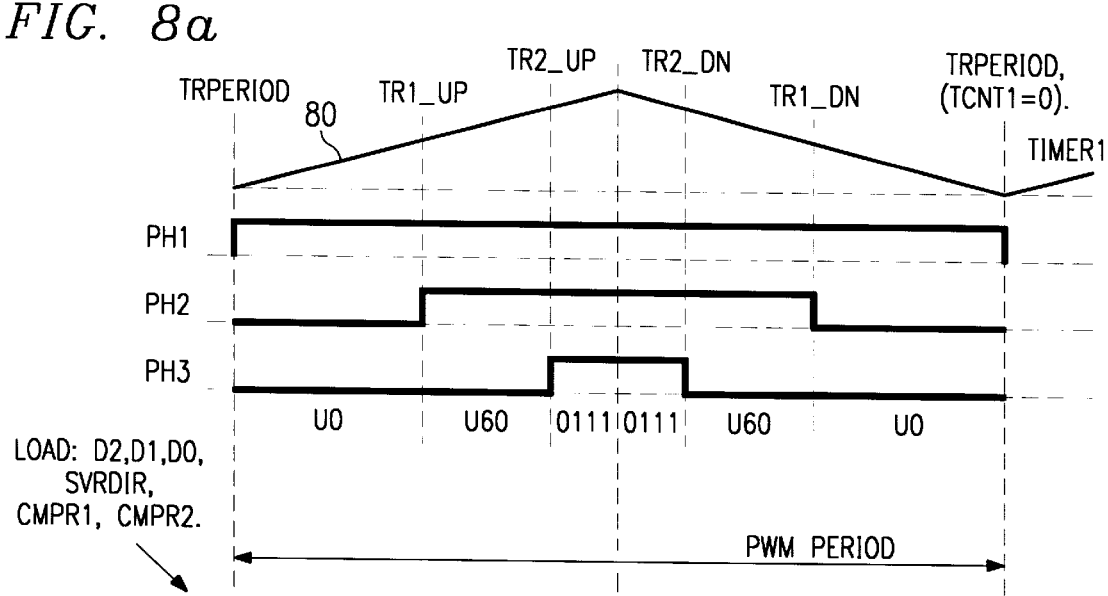
FIG. 8a is a signal diagram showing the three symmetric 4-space vector PWM waveforms in sector 1 with Uout and U60, positive (counterclockwise) rotation direction, SVRDIR=0.
Figure 8B:
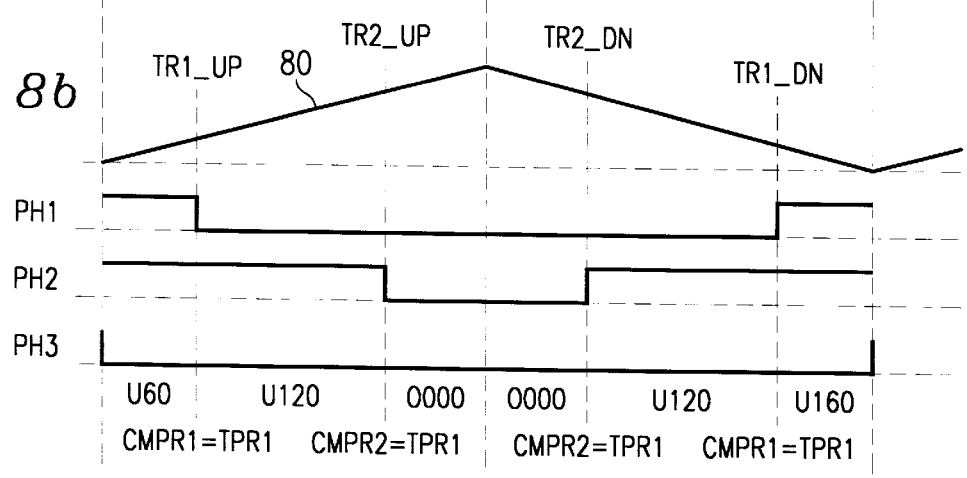
FIG. 8b is a signal diagram showing the three symmetric 4-space vector PWM waveforms in sector 2 with U60 and U120, positive (counterclockwise) rotation direction, SVRDIR=0.

Specifically, FIGS. 8a and 8b through 13a and 13b represent the following cases:

FIG. 8a shows Uout in Sector 1, with U0 and U60, positive (CCW) rotation direction, SVRDIR=0. FIG. 8b shows Uout in Sector 2, with U60 and U120, positive (CCW) rotation direction, SVRDIR=0.

Figure 9A:
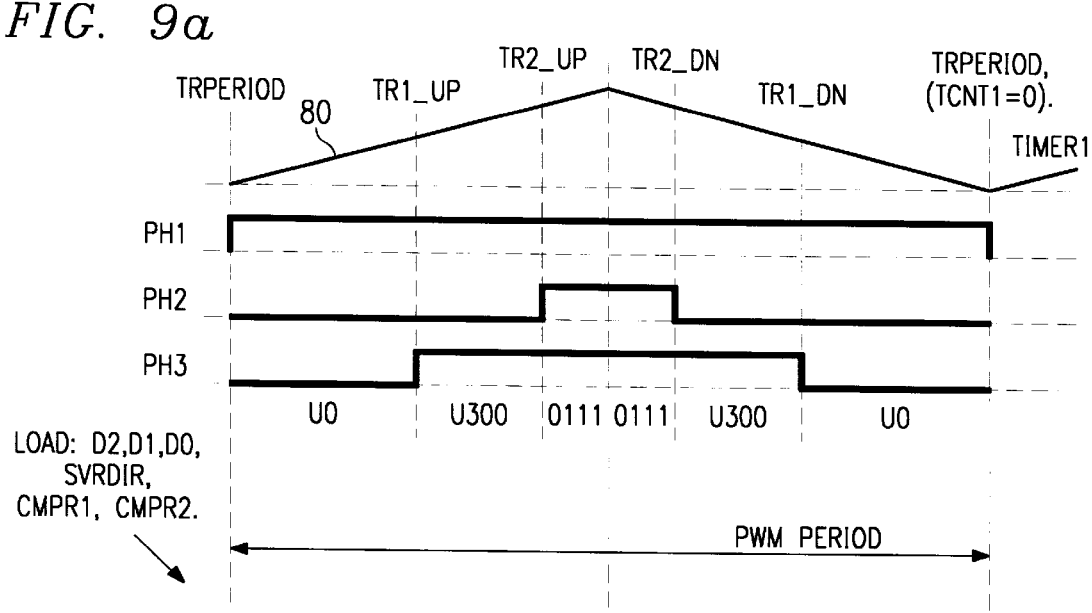
FIG. 9a is a signal diagram showing the three symmetric 4-space vector PWM waveforms in sector 6 with U0 and U300, negative (clockwise) rotation direction, SVRDIR=1.
Figure 9B:
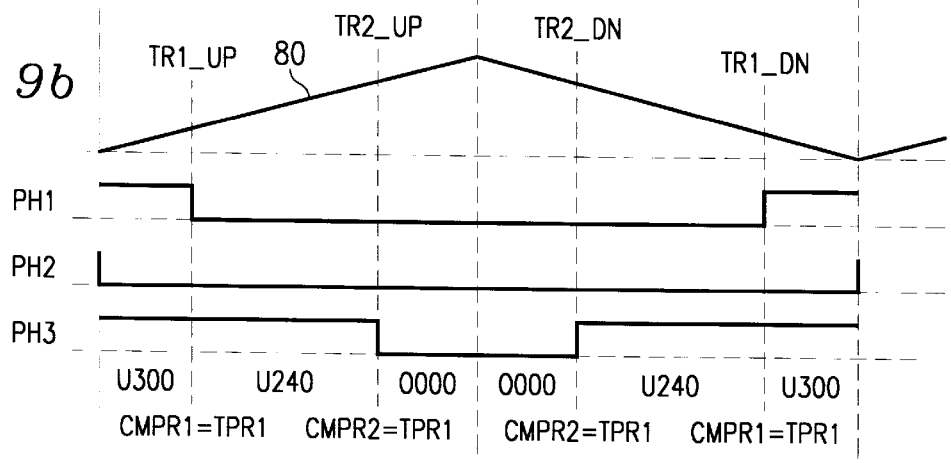
FIG. 9b is a signal diagram showing the three symmetric 4-space vector PWM waveforms in sector 5 with U300 and U240, negative (clockwise) rotation direction, SVRDIR=1.

FIG. 9a shows Uout in Sector 6, with U0 and U300, negative (CW) rotation direction, SVRDIR=1. FIG. 9b shows Uout in Sector 5, with U300 and U240, negative (CW) rotation direction, SVRDIR=1.

Figure 10A:
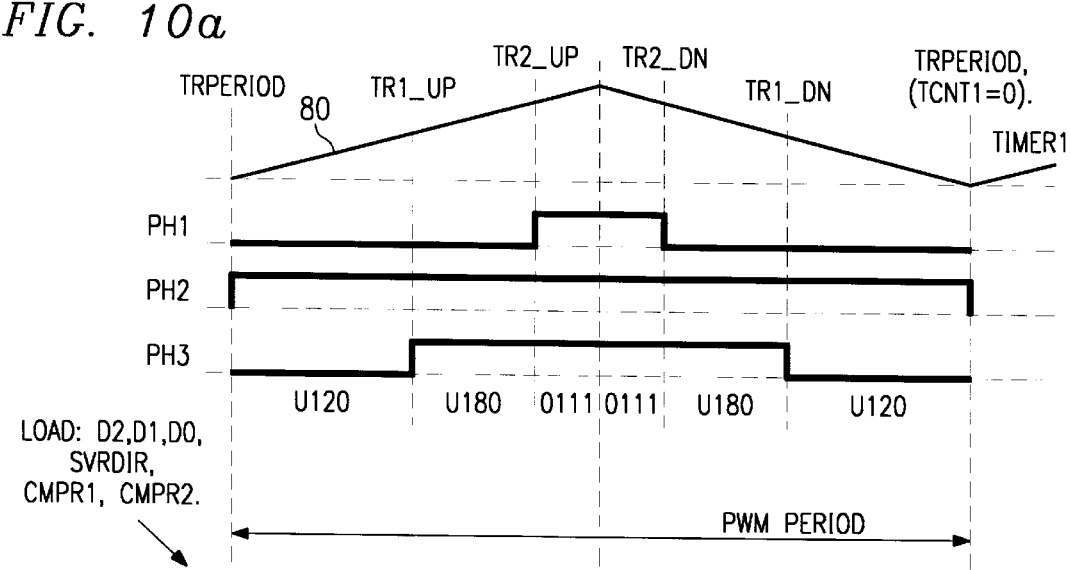
FIG. 10a is a signal diagram showing the three symmetric 4-space vector PWM waveforms in sector 3 with U120 and U180, positive (counterclockwise) rotation direction, SVRDIR=0.
Figure 10B:
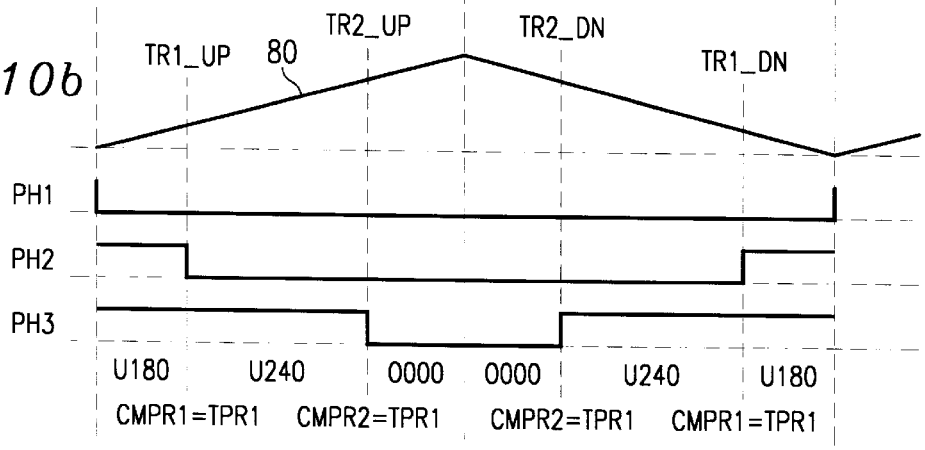
FIG. 10b is a signal diagram showing the three symmetric 4-space vector PWM waveforms in sector 4 with U180 and U240, positive (counterclockwise) rotation direction, SVRDIR=0.

FIG. 10a shows Uout in Sector 3, with U120 and U180, positive (CCW) rotation direction, SVRDIR=0. FIG. 10b shows Uout in Sector 4, with U180 and U240, positive (CCW) rotation direction, SVRDIR=0.

Figure 11A:
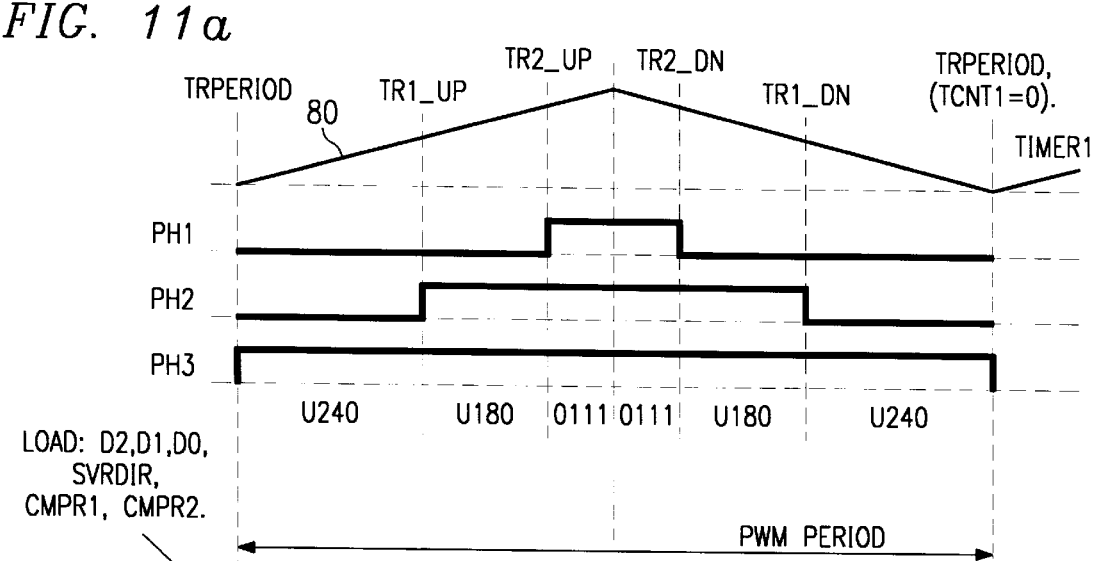
FIG. 11a is a signal diagram showing the three symmetric 4-space vector PWM waveforms in sector 4 with U240 and U180, negative (clockwise) rotation direction, SVRDIR=1.
Figure 11B:
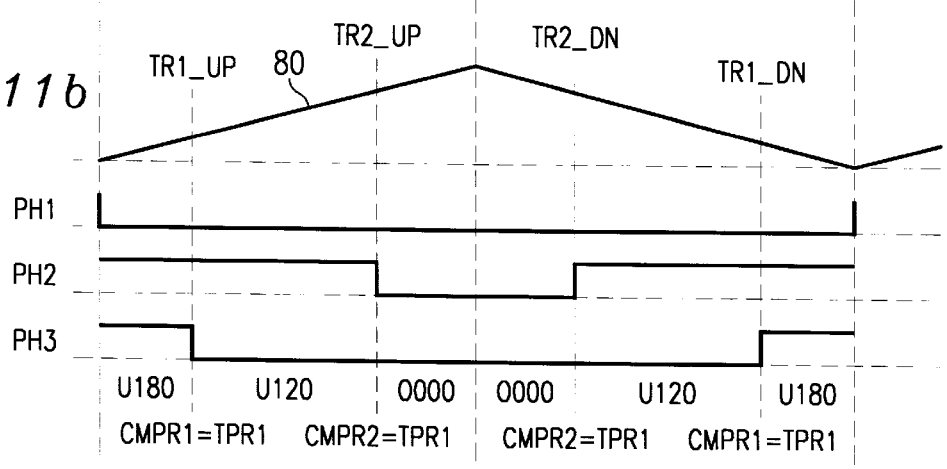
FIG. 11b is a signal diagram showing the three symmetric 4-space vector PWM waveforms in sector 3 with U180 and U120, negative (clockwise) rotation direction, SVRDIR=1.

FIG. 11a shows Uout in Sector 4, with U240 and U180, negative (CW) rotation direction, SVRDIR=1. FIG. 11b shows Uout in Sector 3, with U180 and U120, negative (CW) rotation direction, SVRDIR=1.

Figure 12A:
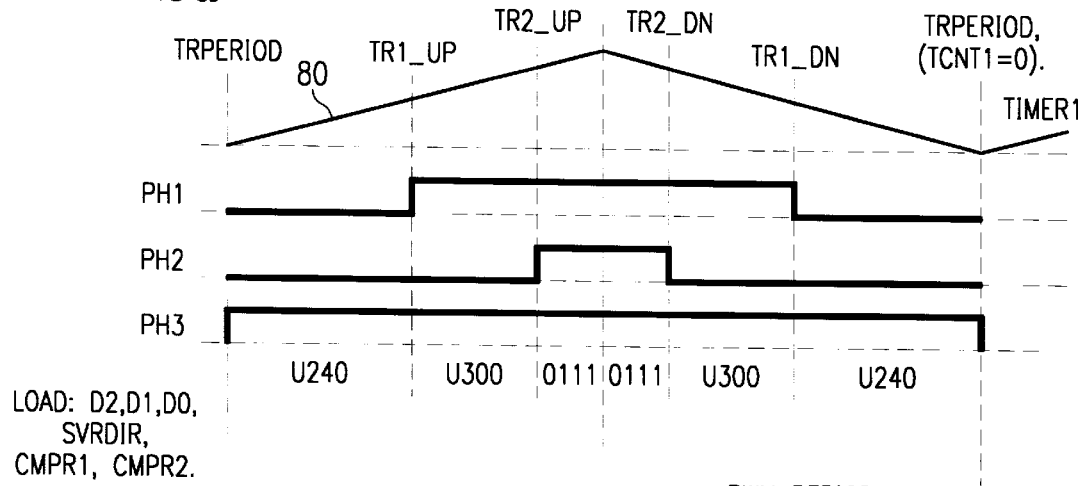
FIG. 12a is a signal diagram showing the three symmetric 4-space vector PWM waveforms in sector 5 with U240 and U300, positive (counterclockwise) rotation direction, SVRDIR=0.
Figure 12B:
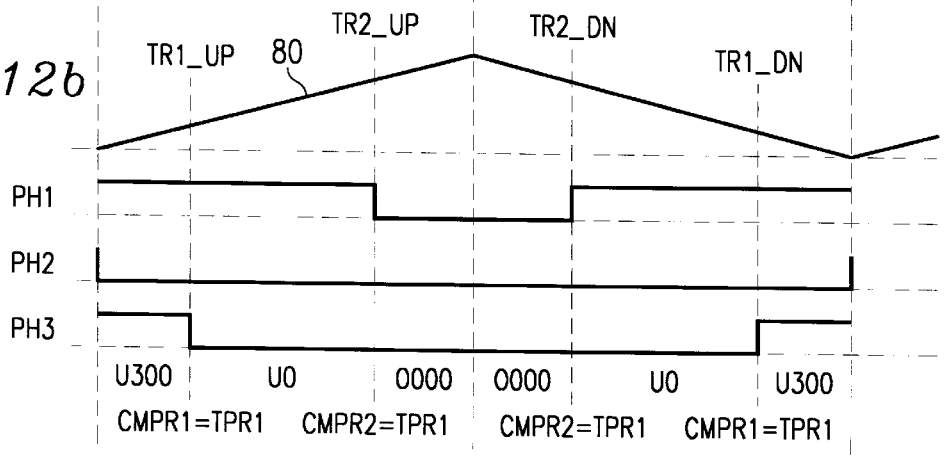
FIG. 12b is a signal diagram showing the three symmetric 4-space vector PWM waveforms in sector 6 with U300 and U0, positive (counterclockwise) rotation direction, SVRDIR=0.

FIG. 12a shows Uout in Sector 5, with U240 and U300, positive (CCW) rotation direction, SVRDIR=0. FIG. 12b shows Uout in Sector 6, with U300 and U0, positive (CCW) rotation direction, SVRDIR=0.

Figure 13A:
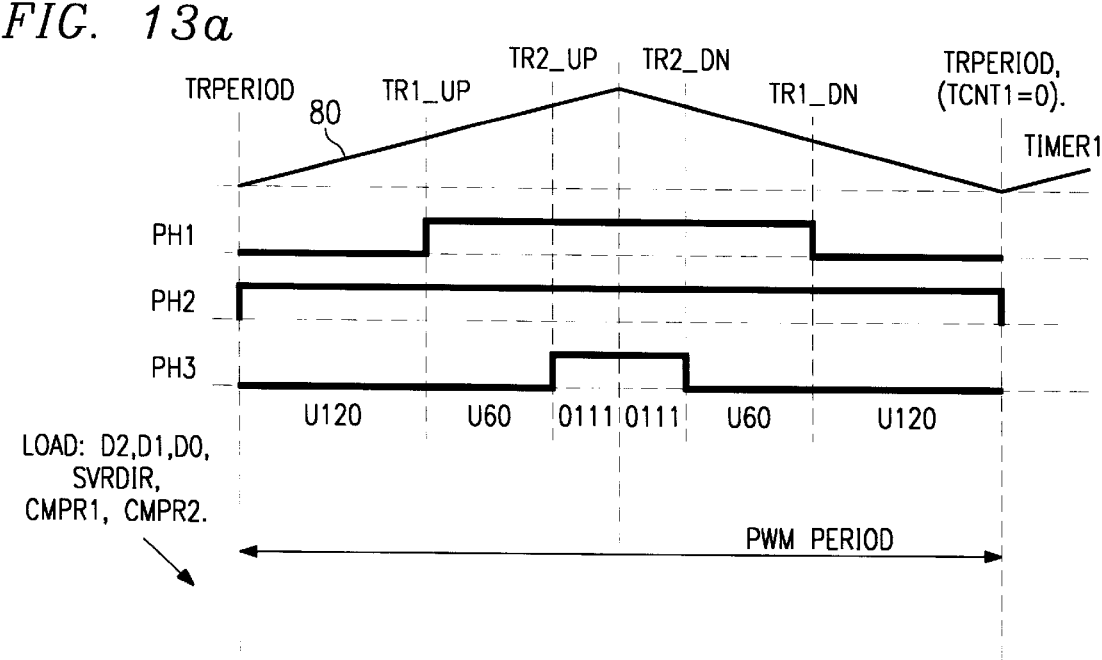
FIG. 13a is a signal diagram showing the three symmetric 4-space vector PWM waveforms in sector 2 with U120 and U60, negative (clockwise) rotation direction, SVRDIR=1.
Figure 13B:
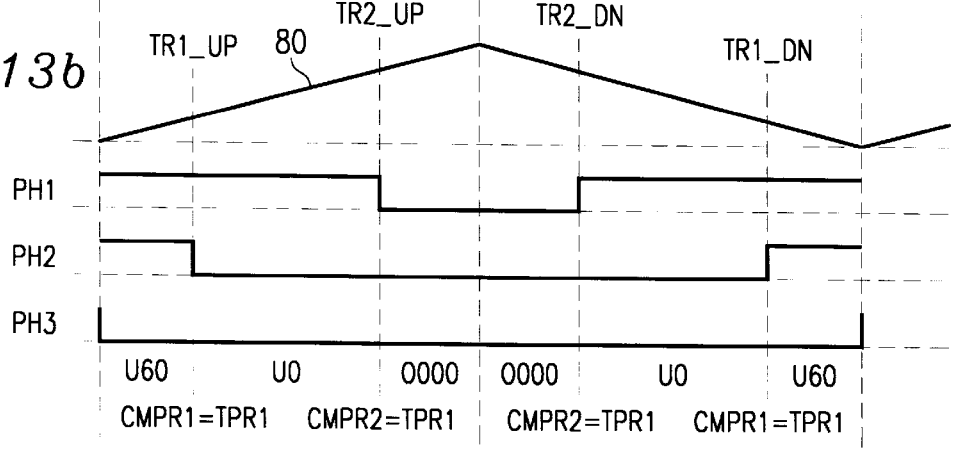
FIG. 13b is a signal diagram showing the three symmetric 4-space vector PWM waveforms in sector 1 with U60 and U0, negative (clockwise) rotation direction, SVRDIR=1.

FIG. 13a shows Uout in Sector 2, with U120 and U60, negative (CW) rotation direction, SVRDIR=1. FIG. 13b shows Uout in Sector 1, with U60 and U0, negative (CW) rotation direction, SVRDIR=1.

Note that in FIGS. 8a and 8b through 13a and 13b, change of magnitude of the Uout changes the pulse duration of the waveforms. Uout may stay in a sector any number of PWM periods, depending on the PWM period, sampling period, speed of rotation (phase of Uout), or changes in the direction of rotations. The shape of the waveforms typically stays the same for as long as Uout is in the same sector, due to the two fixed basic vectors encompassing the sector. As the figures show, one of the waveforms stays low or high over the PWFM period. Depending on which basic vector is loaded to D2, D1, and D0, explained in detail below, and what value is given to SVRDIR, the constant waveform shape will switch between the three waveforms even in a single sector for different PWM periods. Also shown in FIGS. 8a and 8b through 13a and 13b is the output TRPERIOD of a general purpose timer, Timer 1, which can be used to control the timing the PWM periods. Finally, note that CMPR1 and CMPR2 denote compare registers 1 and 2, respectively, and TCNT1 and TPR1 denote the Timer 1 counter and Timer 1 Period register, respectively, as will be described in detail below.

DETAILED PRINCIPLES OF OPERATION

The system operation and method of the preferred embodiment of the present invention will now be explained in detail.

As mentioned above, FIG. 3 illustrates the concept of how basic vectors are distributed and how they encompass the six sectors, and how Uout is expressed in terms of adjacent basic vectors. FIG. 3 also provides the meaning of the binary representation and their relationship to the on and off states of the power transistors.

The instantaneous complex stator voltage space vector Vs for the balanced 3-phase motor/load is calculated by the controller algorithm. If V1, V2, and V3 are voltages applied to the three motor windings 1, 2, 3 (FIG. 1), then $$Vs=Va+\alpha Vb+\alpha^2 Vc=V1+\alpha V2+\alpha^2 V3 \qquad (Eq.\ 1)$$

where $\alpha=\exp\{\pm j2\pi/3\}$. The values $\alpha$ and $\alpha^2$ represent the phase shift operators of $2\pi/3$ and $4\pi/3$ radians in space, respectively. Note that the following holds between the phase voltages Va, Vb, Vc and the terminal voltages.

$$\begin{bmatrix} Va \\ Vb \\ Vc \end{bmatrix} = \frac{1}{3}\begin{bmatrix} 2 & -1 & -1 \\ -1 & 2 & -1 \\ -1 & -1 & 2 \end{bmatrix}\begin{bmatrix} V1 \\ V2 \\ V3 \end{bmatrix}$$

Figure 2:
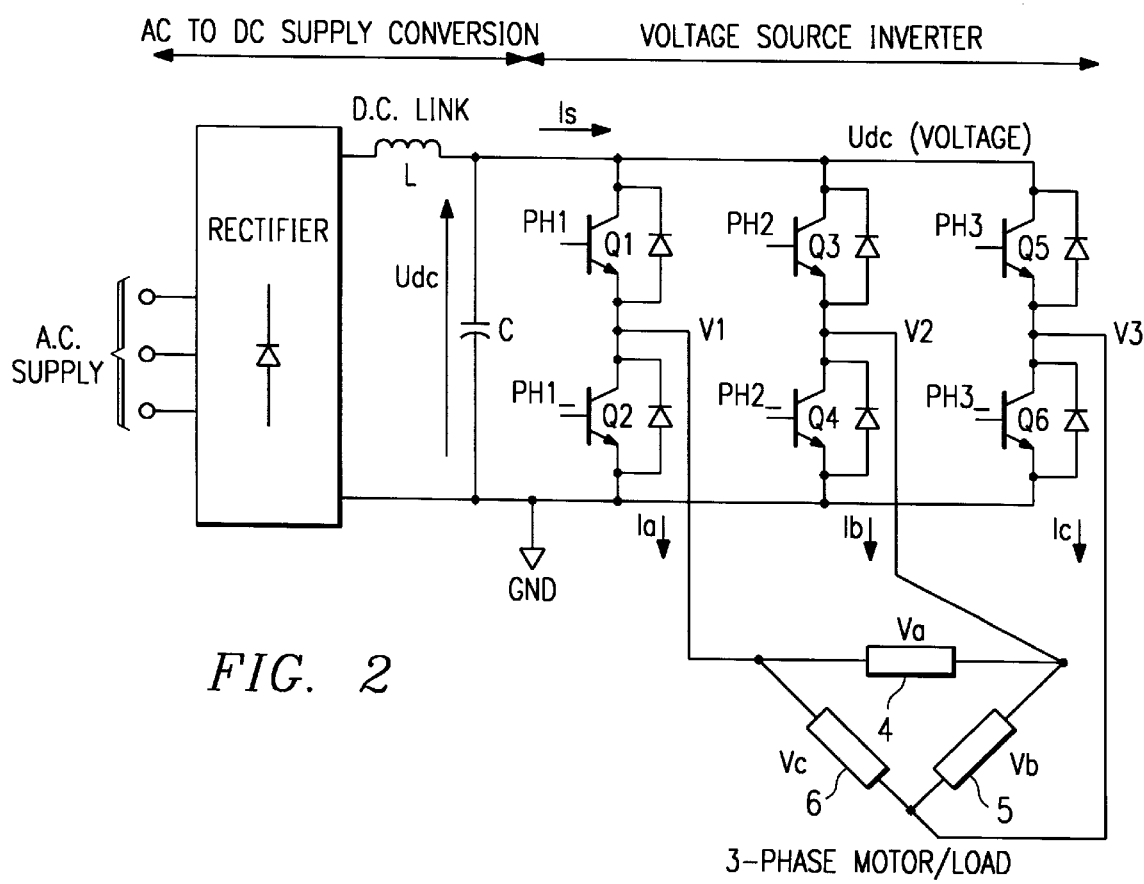
FIG. 2 is a circuit diagram of a three phase voltage source inverter, with an AC to DC power supply link, having a second type of connection to a balanced three phase motor/load.

The 3-Phase Motor/Load shown in FIG. 1 is connected in Wye or Star configuration. FIG. 2 is a circuit diagram of a 3-Phase Motor/Load, having a Delta configuration to a balanced three phase motor/load, comprising windings 4, 5, 6. The explanation below is for a Wye configuration. However, analysis of the Delta configuration of the 3-Phase Motor/Load is similar to that of the Star configuration.

When the transistor Q1 (in FIG. 1) is On, V1=Udc. When Q1 is Off then V1=0. Similarly, V2 and V3 will either be equal to Udc or zero depending on the On state and Off state of the Q3 and Q5, respectively. V1, V2, and V3 can each have only two states. Thus, vector [V1, V2, V3] represents eight space vectors that form a cube in the space.

Projecting [V1, V2, V3], or the vector of phase voltages [Va, Vb, Vc], on to a two-dimensional x-y plane results in Up as $$Up = \begin{bmatrix} Ux \\ Uy \end{bmatrix} = \sqrt{2/3}\begin{bmatrix} 1 & -1/2 & -1/2 \\ 0 & \sqrt{3}/2 & -\sqrt{3}/2 \end{bmatrix}\begin{bmatrix} V1 \\ V2 \\ V3 \end{bmatrix}. \qquad (Eq.\ 2)$$

Thus there are eight Up vectors in the x-y plane, forming a hexagon, for p=0, 60, 120, 180, 240, 300 and two zero vectors for V1=V2=V3=0, and V1=V2=V3=Udc. The non-zero Up vectors are sixty degrees apart forming six sectors in the x-y plane. Referring to FIG. 3, we notice that Up/Udc=Ux, where Ux is the basic space vector in FIG. 3, and V3, V2, and V1 correspond to PH3, PH2, and PH1, respectively. The values of the components of Ux in FIG. 3 are equal to those of Up divided by Udc. Thus, Ux represents normalized version of Up.

Also as shown in FIG. 3, the 3-bit binary representation of Ux and Ux+60 differ only in one bit. This means that switching state of only one transistor changes when switching pattern changes from Ux to its adjacent one, Ux+60.

The magnitude of the six non-zero vectors Up is $\sqrt{2/3}$ Udc. The magnitude of the zero vectors is zero. The zero vectors do not contribute to any current in the 3-phase balanced motor or load.

Relationships between the notations of basic vectors and meaning of their binary representations which specify the On and Off states of the power transistors is shown in Table 1. Phase voltages of the motor corresponding to each basic vector switching pattern for FIG. 1 is also demonstrated in Table 1. Note that the supply voltage is +Udc to GND.

TABLE 1

| Q3: 1 = On, 0 = Off PH3 | Q2: 1 = On, 0 = Off PH2 | Q1: 1 = On, 0 = Off PH1 | Basic Space Vector Ux | 3 Phase Motor Winding Voltages | | |
|---|---|---|---|---|---|---|
| | | | | Vc | Vb | Va |
| 1 | 1 | 1 | O111 | 0 | 0 | 0 |
| 0 | 0 | 1 | U0 | −Udc/3 | −Udc/3 | 2 Udc/3 |
| 0 | 1 | 1 | U60 | −2 Udc/3 | Udc/3 | Udc/3 |
| 0 | 1 | 0 | U120 | −Udc/3 | 2 Udc/3 | −Udc/3 |
| 1 | 1 | 0 | U180 | Udc/3 | Udc/3 | −2 Udc/3 |
| 1 | 0 | 0 | U240 | 2 Udc/3 | −Udc/3 | −Udc/3 |
| 1 | 0 | 1 | U300 | Udc/3 | −2 Udc/3 | Udc/3 |
| 0 | 0 | 0 | O000 | 0 | 0 | 0 |

The projection of a rotating reference voltage space vector Vs on to x-y plane exists and falls into one of the six sectors defined by Up, for p=0, 60, 120, 180, 240, 300.

Let the normalized value of Vs be Uout=Vs/Udc. The method of the preferred embodiment is based on the principle that a rotating voltage Uout can be represented by a linear combination of the two nonzero basic Space vectors Ux and Ux+60 on the x-y plane that encompass the sector containing Uout. That is, the time-integral, or time-average, of Uout can be approximated by sum of products of the two vectors and their time widths:

$$\int_{t1}^{t2} Uout \approx (Ax) \cdot (Ux) + (Bx+60) \cdot (Ux+60),$$

where integration is over the PWM period Tp=t2−t1. Assuming that Uout is constant over the small time interval Tp, we can then write $$(Tp) \bullet (Uout) = (Ax) \bullet (Ux) + (Bx+60) \bullet (Ux+60) + (Cx) \bullet (ZV), \quad \text{(Eq. 3)}$$

for x=0, 60, 120, 180, 240, 300.

Where Tp is taken to be the PWM period in our method. Ax and Bx+60 are constant coefficients of the two non-zero vectors Ux and Ux+60. Cx is the constant coefficient of one of the zero vector O(000) or 0(111). The zero vectors do not have any effect in the above equation since they do not influence the motor/load phase currents and voltages. However, proper selection of the zero vectors is used in my method to generate the symmetry of the PWM waveforms in every PWM period, and to distribute the switching sequence and power dissipation of the transistors.

The relationship between the above coefficients is given by $$Tp = (Ax) + (Bx+60) + (Cx). \quad \text{(Eq. 4)}$$

Dividing both sides of Equation 3 by Tp, we obtain $$Uout = (Tx) \bullet (Ux) + (Tx+60) \bullet (Ux+60) + (Tzx) \bullet (ZV), \quad \text{(Eq. 5)}$$

for x=0, 60, 120, 180, 240, 300.
where $$1 \geq Tx \geq 0, \ 1 \geq Tx+60 \geq 0, \ 1 \geq Tzx \geq 0, \quad \text{(Eq. 6)}$$

and $$(Tx) + (Tx+60) + (Tzx) = 1. \quad \text{(Eq. 7)}$$

Since last term on the right side of (Eq. 5) has no effect, it can also be written as $$Uout = (Tx) \bullet (Ux) + (Tx+60) \bullet (Ux+60). \quad \text{(Eq. 8)}$$

Equation 8 implies that the motor voltage Uout is obtained by applying the transistor switching state represented by Ux for a time period of Tx, and the transistor switching state represented by Ux+60 for a time period of Tx+60 within the PWM period Tp, for as long as Uout falls in the sector specified by Ux and Ux+60 basic vectors. If Tzx is not zero, then Equation 5 can equally be used instead.

As shown by Equation 5 and Equation 8, the order by which the basic vectors and the zero vector are used, or the transistor switching states are applied, to obtain Uout is arbitrary during Tp. That is, the Tx, Tx+60, and Tzx time periods can each be divided into any number of smaller time intervals arbitrarily, and the corresponding Ux, Ux+60, and ZV can then be applied, in any sequential order, for the period of each respective time intervals. This property is shown mathematically by the expression in Equation 9 below.

Equation 5 can be written as $$Uout = \quad \text{(Eq. 9)}$$
$$\left\{\sum_{n=1}^{N}(\alpha)n\right\} \cdot (Ux+60) + \left\{\sum_{m=1}^{M}(\beta)m\right\} \cdot (ZV) + \left\{\sum_{j=1}^{J}(\gamma)j\right\} \cdot (Ux) +$$
$$\left\{\sum_{l=1}^{L}(\theta)l\right\} \cdot (ZV) + \left\{\sum_{k=1}^{K}(\omega)k\right\} \cdot (Ux) + \left\{\sum_{q=1}^{Q}(\delta)q\right\} \cdot (Ux)$$

where $$Tx = \left\{\sum_{j=1}^{J}(\gamma)j\right\} + \left\{\sum_{k=1}^{K}(\omega)k\right\} + \left\{\sum_{q=1}^{Q}(\delta)q\right\},$$

$$Tx+60 = \left\{\sum_{n=1}^{N}(\alpha)n\right\}, \text{ and }$$

$$Tzx = \left\{\sum_{m=1}^{M}(\beta)m\right\} + \left\{\sum_{l=1}^{L}(\theta)l\right\}.$$

In the preferred embodiment of the present invention, two non-zero and one zero basic space vectors are used to approximate Uout in every PWM period Tp. The method is advantageously implemented partly in software and partly in hardware. Depending on which non-zero vector and what direction of movement are chosen by the software at the beginning of each PWM, either zero-vector O(000) or the zero vector O(111) will automatically be used by the hardware. Recalling the properties explained by Equation 5 and Equation 9, Uout is approximated by one of the following Equations 10 and 11 below.

$$Uout = (Tx/2) \bullet (Ux) + ((Tx+60)/2) \bullet (Ux+60) + (Tzx) \bullet (ZV1) + (Tx+60)/2) \bullet (Ux+60) + (Tx/2) \bullet (Ux) \quad \text{(Eq. 10)}$$

$$Uout = (Tx+60)/2) \bullet (Ux+60) + (Tx/2) \bullet (Ux) + (Tzx) \bullet (ZV2) + (Tx/2) \bullet (Ux) + (Tx+60)/2) \bullet (Ux+60). \quad \text{(Eq. 11)}$$

where ZV1 and ZV2 denote the zero-vector used.

FIGS. 8a and 8b through 13a and 13b show how above equations 10 and 11 are implemented (for x=0, 60, 120, 180, 240, 300) and what zero-vector is used in every PWM and in every one of the 6 sectors depending on the direction of the movement CW, or CCW, that is specified by SVRDIR value.

Figure 4:
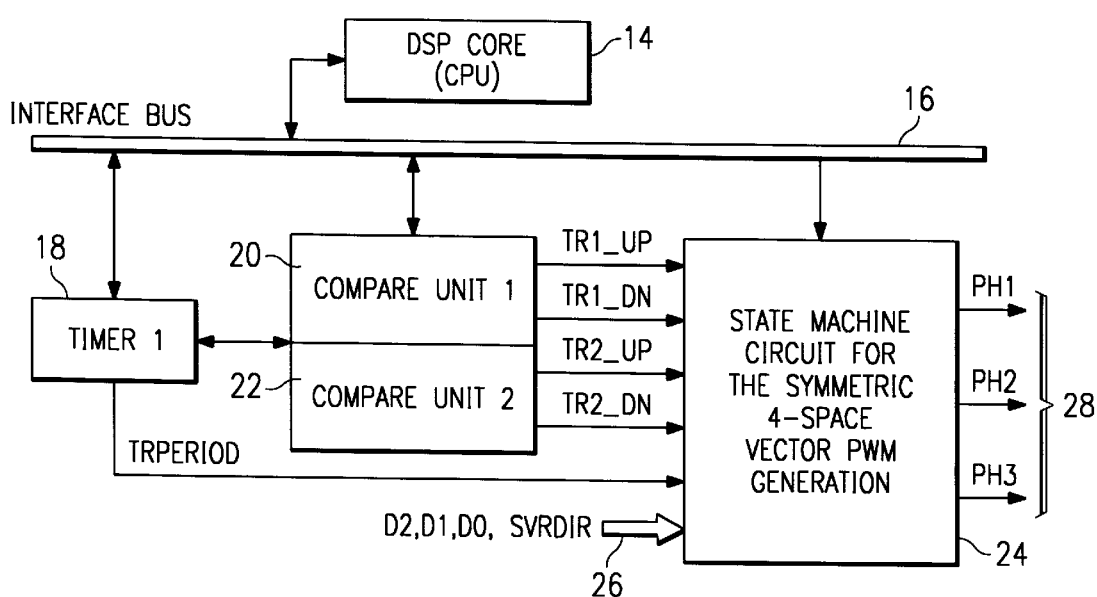
FIG. 4 shows modules that generate the three symmetric 4-Space Vector PWM waveforms PH1, PH2, and PH3.

Software Operation:

FIG. 4 is a block diagram of a portion of a DSP, showing the modules that generate the three symmetric 4-Space Vector PWM waveforms PH1, PH2, and PH3 28 in accordance with the preferred embodiment of the present invention. A DSP Core (CPU) 14 is connected to an Interface Bus 16. Also connected to the Interface Bus 16 are a timer, Timer 1 18, two compare units, Compare Unit 1 20 and Compare Unit 2 22, and a state machine circuit 24 for the vector generation. Timer 1 18 provides output signal TRPERIOD on line 26 to the state machine circuit 24. Compare unit 1 20 provides output signals TR1_UP and TR1_DN to the state machine circuit 24, while Compare unit 2 22 provides output signals TR2_UP and TR2_DN of the state machine circuit 24.

The CPU 14 provides D2, D1, D0 and the SVRDIR values 26 and enables the state machine.

Desired value of Uout is calculated by digital controller software in the CPU 14 in FIG. 4 at the beginning of desired update or sampling period that coincides with the beginning of a PWM period. The update or sampling period can be equal to one or several PWM periods (Tp). From the phase value of the Uout, one of the six sectors and the corresponding basic space vectors, Ux and Ux+60, are identified. The magnitude and phase values of the identified Ux and Ux+60 are known. Using Equation 8 for the magnitude and phase variables, the values of Tx and Tx+60 are calculated. Scaled values of T1=Tx and T2=(Tx)+(Tx+60) are then loaded into two compare registers, CMPR1 and CMPR2 (not shown) in Compare Unit 1 20 and Compare Unit 2 22, respectively, as shown in FIG. 4. The software then specifies and loads the direction bit SVRDIR, and the starting basic vector (Ux or Ux+60) into the register bits D2, D1, D0. The hardware then automatically generates symmetric PWM waveforms as shown in FIGS. 8a and 8b through 13a and 13b.

Figure 14A:
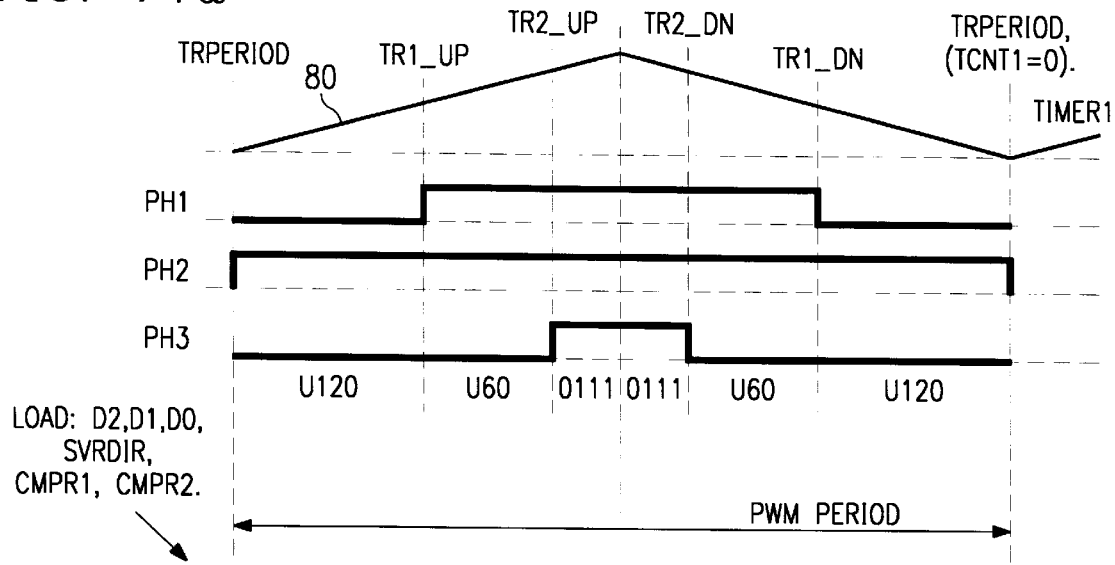
FIG. 14a is a signal diagram showing how the PWM waveforms will change for sector 2, in comparison to FIG. 8b, when alternating Off and On state of all three PWM channels is desired within the same sector.
Figure 14B:
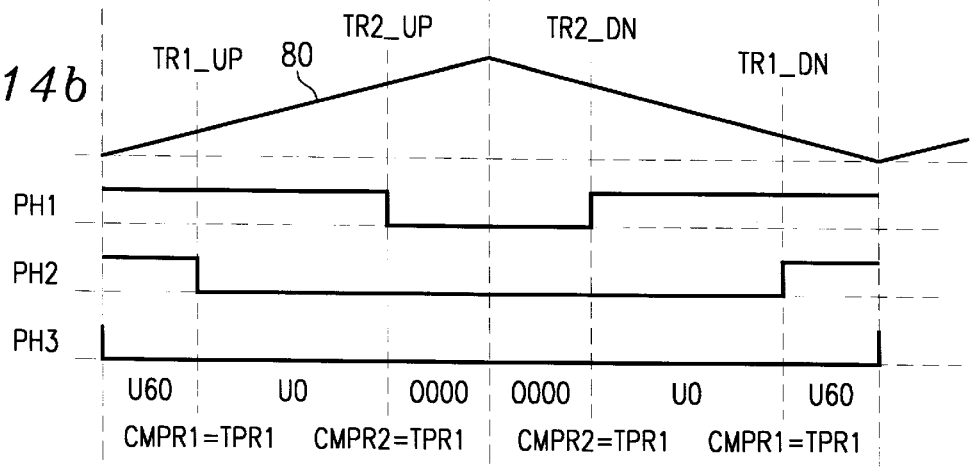
FIG. 14b is a signal diagram showing how the PWM waveforms will change for sector 1, in comparison to FIG. 8a, when alternating Off and On state of all three PWM channels is desired within the same sector.

As shown by FIGS. 8a and 8b through 13a and 13b, one of the three PWM channels stays either Off or On (high or low) during the PWM periods for as long as Uout stays in the same sector. In certain applications, such as variable speed control of motors, this provides optimum switching patterns for the transistors with low switching losses or power dissipation in the power drive circuit. In high performance servo systems and at very low speeds, it may be desired to alternate Off and On states of all PWM channels and thus the power transistors even when Uout stays in the same sector for more than one PWM period. To achieve this, software can simply exchange loading of Ux by Ux+60 into the D2, D1, D0, register bits, and that of T1 by Tx+60, and reversing the value of SVRDIR bit, at the beginning of any update or sampling period. FIG. 14a and 14b show how the PWM waveforms changes for sectors 1 and 2, in comparison to FIG. 8b and 8a, when alternating Off and On state of all three PWM channels is desired within the same sector.

Hardware Operation:

FIG. 4 shows the functional blocks and signals that are used to generate the three Symmetric 4-Space Vector PWM waveforms PH1, PH2, and PH3 that are presented in FIGS. 8a and 8b through 14a and 14b. Timer 1 18 is an Up/Down Timer-Counter that counts up to a value equal to half of Tp, and then counts down to zero again. This counting process is shown by the triangular signal 80 in FIGS. 8a and 8b through 14a and 14b. At the beginning and end of every PWM period Tp (where Tp is equal to one complete up and down counting cycle of Timer 1 18), or equivalently when the Timer 1 18 counter value is equal to 0, the signal TRPERIOD is generated by the Timer 1 18 and sent to the state machine circuit 24. Also, whenever the value of the Timer 1 18 matches the value in the compare register of Compare Unit 1 20 (CMPR1) or Compare Unit 2 22 (CMPR2), then signals TR1_UP, TR1_DN, TR2_UP, TR2_DN are generated and sent to the state machine circuit 24.

FIG. 7 is a diagram showing the functional blocks of the State Machine 24 that generates the symmetric 4-space vector PWM signals PH1, PH2, and PHE3 repeatedly and automatically, when the required input signals are supplied. General operation will now be described. TRPERIOD signals the start of new PWM period. The values of D2, D1, D0, and SVRDIR are loaded into an Auxiliary Register Q 70. A State Machine Logic Unit 72 outputs the appropriate values to an Auxiliary Register SMV 74 that outputs the three symmetric 4-space vector PWM waveforms PH1, PH2, and PH3. The state machine logic selects the correct outputs based on the values of the SVRDIR, D2, D1, D0, and the proper occurrences of the signals TR1_UP, TR2_UP, TR2_DN, and TR1_DN in every PWM period. If there are user or software calculation error and these signals do not occur correctly, the Boundary Conditions Logic 76 intercepts the process and provides safe, but possibly incorrect, PWM outputs at PH1, PH2, and PH3. The State Machine 24 works independently from the CPU once it has been started. The State Machine 24 is described in more detail below.

Figure 5:
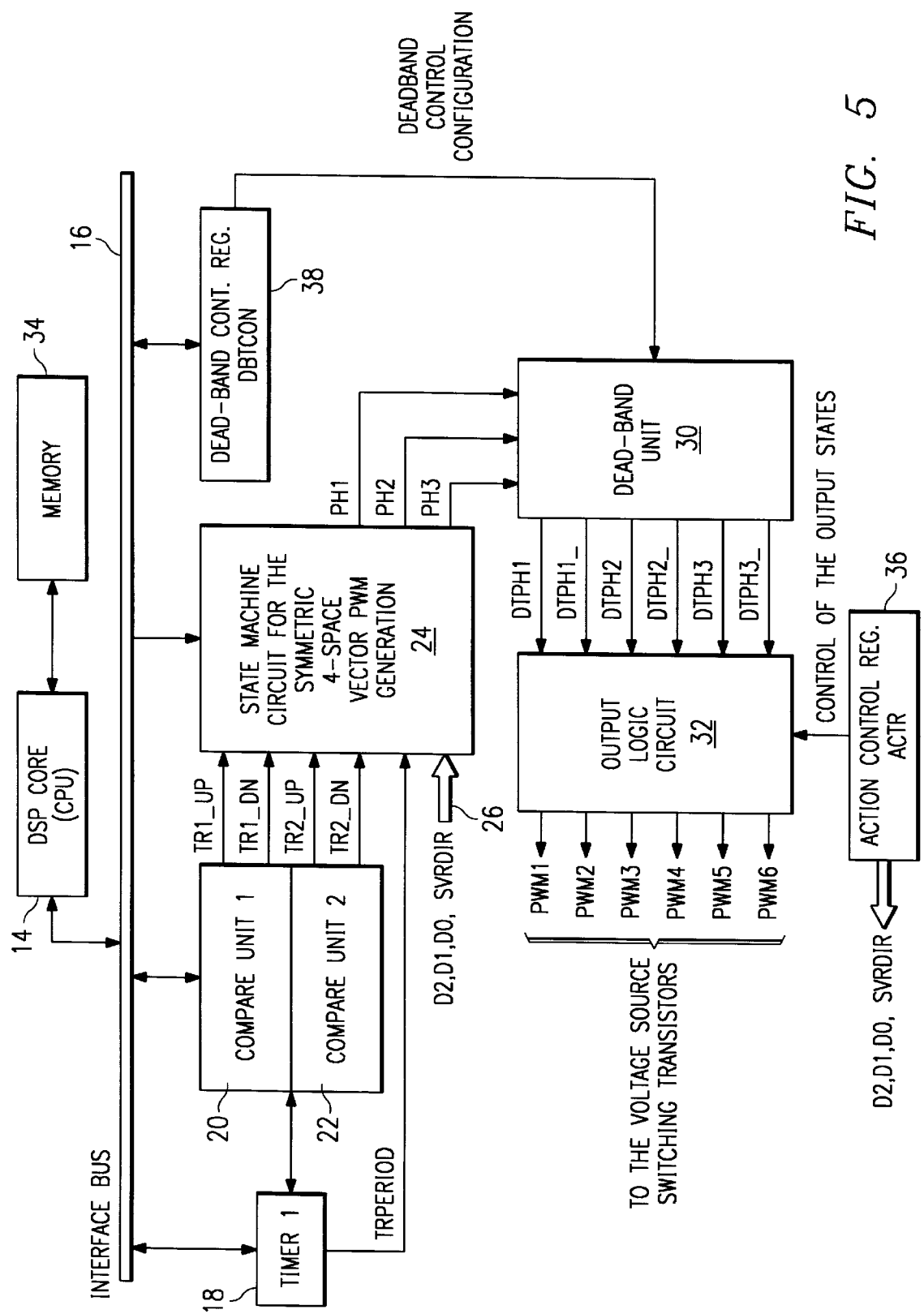
FIG. 5 shows all the blocks used in a typical application of the preferred embodiment to generate desired symmetric 4-space vector PWM waveforms (6 channels) with the deadband unit and the output logic that controls state and polarity of every output channel individually.

FIG. 5 shows all the blocks used in a typical application of the preferred embodiment to generate desired symmetric 4-space vector PWM waveforms (six channels). The CPU 14, Timer 1 18, Compare Unit 1 20, Compare Unit 22, and State Machine Circuit 24, described above in connection with FIG. 4, are shown. Also shown are a deadband unit 30 and an output logic circuit 32 that controls the state and polarity of every output channel individually.

The CPU 14 calculates Uout, the sector, the corresponding t1 and t2, and the SVRDIR. It also loads proper values into the compare registers in Compare Unit 1 20 and Compare Unit 22, using stored data in a memory 34. CPU 14 also loads and starts the Timer 1 18 and the deadband unit 30. An Action Control Register ACTR 36 is also set by CPU 14 to control polarity of the PWM outputs via the output logic unit 32. The ACTR 36 provides the inputs D2, D1, D0, and SVRDIR to the State Machine Circuit 24.

Start and end of every PWM is defined by the Timer 1 18 period value, TRPERIOD. The TRPERIOD signal signals the State Machine to start a new PWM period. Values in Compare register 1 and 2 produce the signals TR1_UP, TR1_DN, TR2_UP and TR2_DN, respectively. The State Machine 24, described above in connection with FIG. 7, produces the symmetric 4-space vector PWM waveforms denoted by PH1, PH2, and PH3. The PHx (for x=1,2,3) waveforms are used by the deadband unit 30 to generate the output pair PHx and PHx_, the non-overlapping pair of signals. Polarity of each corresponding output is set by the ACTR register 36 in the output logic unit 32. The signals PWMy, for y=1,2,3,4,5 and 6 can directly be used to switch(turn On and turn Off) the power transistors of the voltage source inverter.

PH1, PH2, and PH3 are sent to the deadband generator unit 30 which produces the pairs of complementary PWM signals DTPH1 and DTPH1_, DTPH2 and DTPH2_, DTPH3 and DTPH3_, respectively. These complementary pairs of signals are non-overlapping PWM signals that are required to turn On and Off the upper and the lower power transistor of each leg of the power converter shown in FIG. 1. It will be recalled that the deadband is the time delay that is needed for a transistor to turn off before the other transistor is turned on, and vise versa, by a pair of complementary PWM signals. The Output Logic Circuit 32 allows the user to intervene and specify the polarity and states of the PWM channels individually, based on the choice of power transistor types and their driving circuits.

The Dead-band Control Register 38 and the ACTR 36 of FIG. 5 represent the control registers for setting up the proper value of the deadband and the operation of the Output Logic Unit 32, respectively. The ACTR 36 also includes registers for storing the bit values of SMRDIR as well as D2, D1, and D0. The basic space vector Ux (or Ux+60) represented by its 3 binary bits is loaded into the bits D2, D1, D0 at the beginning of every update or sampling period as described above. Memory 34 may be used to tabulate information on the eight basic vectors and the six sectors.

Figure 6:
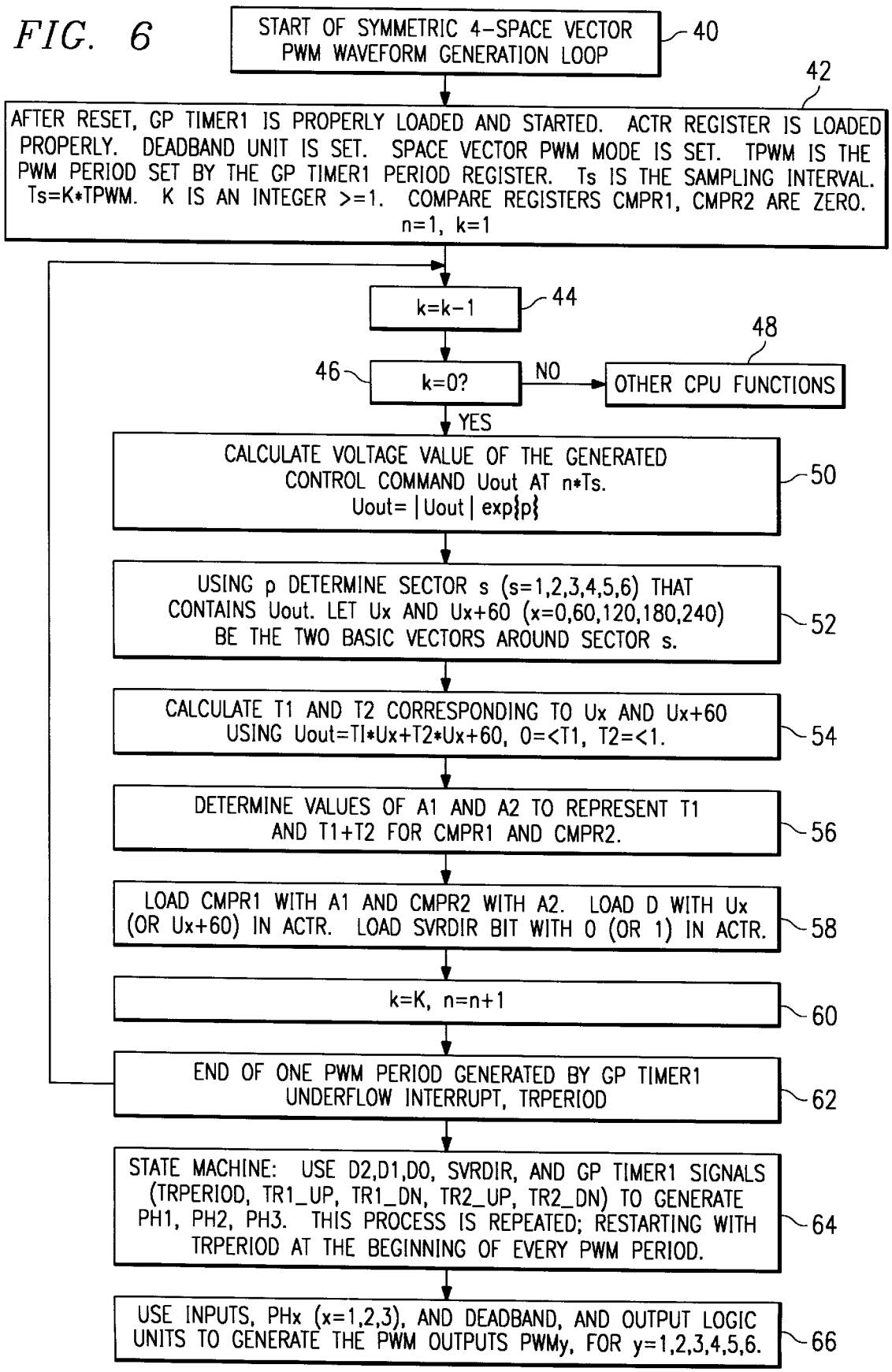
FIG. 6 is a flow chart showing an entire routine for the software and hardware control and generation of the symmetric 4-space vector PWM waveforms.

The entire software process utilized in conjunction with the hardware shown in FIG. 5, is shown in the flow diagram of FIG. 6, in which an entire routine for the software and hardware control and generation of the symmetric 4-space vector PWM waveforms is illustrated.

As can be seen in FIG. 6, the method starts 40 and a set-up is performed 42. After RESET, Timer 1 18 is properly loaded and started. A counter register is loaded properly, as well. The deadband unit is set, as is the Space Vector PWM mode. The TPWM is the PWM period set by Timer 1 18. Ts is the sampling interval, K*TPWM. K is an integer greater than or equal to 1. The compare registers, CMPR1 and CMPR2, are set to zero. A value n is set to 1, as is a value k.

Then, k is decremented by 1 44, and then k is examined 46 to determine if it is equal to 0. If it is not, other CPU functions not related to the practice of the inventive method may be performed 48. On the other hand, if k is equal to 0, the voltage value of the generated control command Uout is calculated 50 at n*Ts. Uout is equal to |Uout| exp{p}, i.e., the absolute value of Uout times the exponent of p.

Then, using p, the sector s (s=1,2,3,4,5,6) is determined 52 that contains Uout. The vectors Ux and Ux+60 (x=0, 60, 120, 180, 240, 300) are the two Basic Vectors around sector s. T1 and T2 are then calculated 54 corresponding to Ux and Ux+60, using Uout=T1*Ux+T2*Ux+60, where $0 \leq T1$, $T2 \leq 1$. The values A1 and A2 are then determined 56 to represent T1 and T1+T2, for CMPR1 and CMPR2. Register CMPR1 is loaded with A1 and register CMPR2 is loaded with A2. Register bits D1, D2, D3 are loaded with Ux (or Ux+60) in the ACTR 36. The SVRDIR register in the ACTR 36 is loaded with either a 0 or a 1, as determined. Then, k is set to K, and n is set to n+1.

At the end of one PWM period, a Timer 1 underflow interrupt is generated 64, signaling TRPERIOD, which returns the routine to block 44. In addition, in the state machine circuit 24 D2, D1, D0, SVRDIR and the Timer 1 signals (TRPERIOD, TR_UP, TR1_DN, TR2_UP and TR2_DN), are used to generate PH1, PH2 and PH3. This process is repeated, restarting with TRPERIOD, at the beginning of every PWM period.

Finally, the PWM outputs, PWMy, for y=1, 2, 3, 4, 5, 6, are generated 66 in the Output Logic Unit 32, using the inputs PHx (x=1,2,3) and the deadband value.

State Machine Design

Operation of the state machine 24 shown in FIG. 7 will now be described in detail. A 3-bit register D is in ACTR (Action Control Register) 36 (FIG. 5), and stores values of D2, D1, D0. Auxiliary Register Q 70 stores intermediate values, and Auxiliary Register SMV 74 holds the states of the output PWM signals.

The following logic statements define the behavior of the state machine, and therefore can be entered into any of a number of high level logic design systems to derive automatically a circuit implementing the state machine. The statements are in five groups corresponding to five different types of transition occurrences.

1) When a transition occurs on TRPERIOD (TCNT1= 0000h):

| | | |
|---|---|---|
| if (D = O000) | then Q = D | and SMV = O000 |
| if (D = O111) | then Q = D | and SMV = O111 |
| if (D = U0) | then Q = D | and SMV = U0 |
| if (D = U60) | then Q = D | and SMV = U60 |
| if (D = U120) | then Q = D | and SMV = U120 |
| if (D = U180) | then Q = D | and MSV = U180 |
| if (D = U240) | then Q = D | and SMV = U240 |
| if (D = U300) | then Q = D | and SMV = U300 |

2) When a transition occurs on TR1_UP:

| | | |
|---|---|---|
| if (Q = O000) | then SMV = O000 | |
| if (Q = O111) | then SMV = O111 | |
| if (Q = U0 and SVRDIR = 0) | then Q = U60 | and SMV = U60 |
| if (Q = U0 and SVRDIR = 1) | then Q = U300 | and SMV = U300 |
| if (Q = U60 and SVRDIR = 0) | then Q = U120 | and SMV = U120 |
| if (Q = U60 and SVRDIR = 1) | then Q = U0 | and SMV = U0 |
| if (Q = U120 and SVRDIR = 0) | then Q = U180 | and SMV = U180 |
| if (Q = U120 and SVRDIR = 1) | then Q = U60 | and SMV = U60 |
| if (Q = U180 and SVRDIR = 0) | then Q = U240 | and SMV = U240 |
| if (Q = U180 and SVRDIR = 1) | then Q = U120 | and SMV = U120 |
| if (Q = U240 and SVRDIR = 0) | then Q = U300 | and SMV = U300 |
| if (Q = U240 and SVRDIR = 1) | then Q = U180 | and SMV = U180 |
| if (Q = U300 and SVRDIR = 0) | then Q = U0 | and SMV = U0 |
| if (Q = U300 and SVRDIR = 1) | then Q = U240 | and SMV = U240 |

3) When a transition occurs on TR2_UP (SVRDIR state is DON'T CARE here):

| | |
|---|---|
| if (Q = O000) | then SMV = O000 |
| if (Q = O111) | then SMV = O111 |
| if (Q = U0) | then SMV = O000 |
| if (Q = U60) | then SMV = O111 |
| if (Q = U120) | then SMV = O000 |
| if (Q = U180) | then SMV = O111 |
| if (Q = U240) | then SMV = O000 |
| if (Q = U300) | then SMV = O111 |

4) When a transition occurs on TR2_DN:

| | | |
|---|---|---|
| if (Q = O000) | then SMV = O000 | |
| if (Q = O111) | then SMV = O111 | |
| if (Q = U0 and SVRDIR = 0) | then Q = U300 | and SMV = U0 |
| if (Q = U0 and SVRDIR = 1) | then Q = U60 | and SMV = U0 |
| if (Q = U60 and SVRDIR = 0) | then Q = U0 | and SMV = U60 |
| if (Q = U60 and SVRDIR = 1) | then Q = U120 | and SMV = U60 |
| if (Q = U120 and SVRDIR = 0) | then Q = U60 | and SMV = U120 |
| if (Q = U120 and SVRDIR = 1) | then Q = U180 | and SMV = U120 |
| if (Q = U180 and SVRDIR = 0) | then Q = U120 | and SMV = U180 |
| if (Q = U180 and SVRDIR = 1) | then Q = U240 | and SMV = U180 |
| if (Q = U240 and SVRDIR = 0) | then Q = U180 | and SMV = U240 |
| if (Q = U240 and SVRDIR = 1) | then Q = U300 | and SMV = U240 |
| if (Q = U300 and SVRDIR = 0) | then Q = U240 | and SMV = U300 |
| if (Q = U300 and SVRDIR = 1) | then Q = U0 | and SMV = U300 |

5) When a transition occurs on TR1_DN (SVRDIR state is DON'T CARE here):

| | |
|---|---|
| if (Q = O000) | then SMV = O000 |
| if (Q = O111) | then SMV = O111 |
| if (Q = U0) | then SMV = O000 |
| if (Q = U60) | then SMV = O111 |
| if (Q = U120) | then SMV = O000 |
| if (Q = U180) | then SMV = O111 |
| if (Q = U240) | then SMV = O000 |
| if (Q = U300) | then SMV = O111 |

Control of the boundary conditions for any given implementation of the present invention is the task of the user software, and the coding is well within the purview of those of ordinary skill in the software arts, once the principles set forth herein are understood. The user software must assure that the value loaded in compare register 1 (CMPR1) is always less than that of compare register 2 (CMPR2), and that the value in CMPR2 is less than the value loaded into the period register of the timer. The value of the Timer 1 18 period register in the Up&Down counting mode must always be equal to half of the PWM period Tp. To provide additional protection, the boundary condition logic 76, shown in FIG. 7, sets the outputs PH1, PH2, and PH3 to zero (or low state), to turn off all the power transistors, if the values of CMPR1, CMPR2, are set to zero during the operation.

Implementing the preferred embodiment in circuitry can use less than 1000 transistors, including the state machine. The circuit design is, thus, efficient, low cost and small in size. It is thus suitable for on-chip integration, most advantageously on a DSP chip. Eliminating off-chip components reduces system chip counts, and thus overall system cost.

In summary, the preferred embodiment uses one Up/Down 16-bit timer, two 16 bit Compare Registers, 5 control signals, a state machine and control logic to produce the main three independent high resolution SV PWM pulsing channels. Each channel then produces two outputs with programmable deadbands, making a total of six PWM outputs to control three phase loads and AC induction motors. Generating the three main SV PWM channels using the preferred embodiment minimizes CPU overhead: it reduces the software program size and eliminates software execution times and interrupt handling schemes. Because of this, the DSP can be used to implement more complex control algorithms at very high sampling rates and high PWM carrier frequencies. For example, implementing the preferred embodiment on a Texas Instruments ® TMS320C24x device with 50 ns per instruction cycle, up to about 96 program instructions can be eliminated, and up to 4.8 $\mu$s of CPU program execution time can be saved in every PWM period. For a typical PWM carrier frequency of 25 KHz, which gives 40 $\mu$s PWM period cycle, this circuit can thus yield up to 4.8/40=0.12 or a 12% time saving factor in every PWM period. In high performance motor control systems, PWM periods can reach as low as 25 $\mu$s.

Four basic space vectors are used in every PWIM period, and there are five switching instances in every period for normal operation. The transistor's switching states in the second half of the PWM period are mirror images of the states in the first half. Two different zero basic space vectors and two nonzero basic space vectors are used. These basic vectors specify the output PWM pulses and the switching of the transistors. The basic vectors are generated automatically by the hardware circuit, i.e., the state machine, in every PWM period. The two zero basic space vectors and two non-zero basic vectors are used to make the average turn-on and turn-off durations of the power transistors equal, in a 360° rotation of the inverter output voltage vector, or equivalently, in one complete rotation of the AC induction motor's stator field (or shaft), when torque and speed of the load/motor are fixed. This design improves the over-stress condition of the power transistor in the inverter and produces optimized uniform distribution of power dissipation. Because of this, the reliability and life cycle of the power transistors are improved.

Although the present invention and its advantages have been described in detail, it should be understood that various changes, substitutions and alterations can be made herein without departing from the spirit and scope of the invention as defined by the appended claims.

What is claimed is:

1. A control apparatus for controlling a three phase load apparatus, comprising:
  a voltage source inverter comprising
    a first pair of transistors,
    a second pair of transistors,
    a third pair of transistors,
    each such pair of transistors being connected serially between the terminals of a voltage source, the activation of a first transistor in each such pair of such transistors by the application thereto of a first activation voltage, a second activation voltage and a third activation voltage, respectively, causing a first phase voltage, a second phase voltage and a third phase voltage, to be applied to a respective one of the three parts of said three-phase load apparatus, the selection and duration of activation of said first transistors during each of a continuing series of equal time periods $T_p$ represented by six non-zero vectors and two zero vectors;
  a processor;
  a bus coupled to said processor for communicating data between said processor and other control apparatus elements;
  a counter coupled to said bus for providing a counter value counting from a first value to a second value during one half of $T_p$ and then counting from said second value to said first value during a second half of $T_p$, for each of said equal time periods $T_p$;
  a compare unit coupled to said bus, having a plurality of registers for the storage of transition count values corresponding to the transition times between said activations of said first transistors in accordance with predetermined space vectors, for comparing said counter value against said transition count values and providing respective transition timing signals when said counter value is the same as said transition count values;
  a state machine coupled to said bus and to said compare unit for generating said first activation voltage, said second activation voltage and said third activation voltage and providing them to said voltage source inverter in response to said respective transition timing signals.

2. A control apparatus as in claim 1, wherein said counter farther generates a periodic timing signal, TRPERIOD, representing the beginning of each of said series of equal time periods $T_p$, and provides said periodic timing signal to said state machine.

3. A control apparatus as in claim 2, wherein said compare unit generates a first one of said transition timing signals, TR1_UP, and a second one of said transition timing signals, TR2_UP, when said counter is counting up, and said compare unit generates a third one of said transition timing signals, TR1_DN, and a fourth one of said transition timing signals, TR2_DN, when said counter is counting down.

4. A control apparatus as in claim 3, wherein said processor periodically provides said state machine with values corresponding to a current space vector and to a direction of rotation of said current space vector.

5. A control apparatus as in claim 4, wherein:

said predetermined space vectors are of the type characterized as O000, O111, U0, U60, U120, U180, U240 and U300;

said state machine generates said first activation voltage, said second activation voltage and said third activation voltage in accordance with the following procedure, wherein D represents said current space vector provided by said processor, wherein a value SVRDIR represents the direction of rotation of said current space vector, 0 representing a first direction and 1 representing a second direction, wherein Q represents a register, wherein SMV represents a space vector determining a current combination of said first activation voltage, said second activation voltage and said third activation voltage:

A) when a transition occurs on TRPERIOD (TCNT1= 0000h):

| | | |
|---|---|---|
| if (D = O000) | then Q = D | and SMV = O000, |
| if (D = O111) | then Q = D | and SMV = O111, |
| if (D = U0) | then Q = D | and SMV = U0, |
| if (D = U60) | then Q = D | and SMV = U60, |
| if (D = U120) | then Q = D | and SMV = U120, |
| if (D = U180) | then Q = D | and MSV = U180, |
| if (D = U240) | then Q = D | and SMV = U240, |
| if (D = U300) | then Q = D | and SMV = U300, |

B) when a transition occurs on TR1_UP:

| | | |
|---|---|---|
| if (Q = O000) | then SMV = O000 | |
| if (Q = O111) | then SMV = O111 | |
| if (Q = U0 and SVRDIR = 0) | then Q = U60 | and SMV = U60, |
| if (Q = U0 and SVRDIR = 1) | then Q = U300 | and SMV = U300, |
| if (Q = U60 and SVRDIR = 0) | then Q = U120 | and SMV = U120, |
| if (Q = U60 and SVRDIR = 1) | then Q = U0 | and SMV = U0, |
| if (Q = U120 and SVRDIR = 0) | then Q = U180 | and SMV = U180, |
| if (Q = U120 and SVRDIR = 1) | then Q = U60 | and SMV = U60, |
| if (Q = U180 and SVRDIR = 0) | then Q = U240 | and SMV = U240, |
| if (Q = U180 and SVRDIR = 1) | then Q = U120 | and SMV = U120, |
| if (Q = U240 and SVRDIR = 0) | then Q = U300 | and SMV = U300, |
| if (Q = U240 and SVRDIR = 1) | then Q = U180 | and SMV = U180, |
| if (Q = U300 and SVRDIR = 0) | then Q = U0 | and SMV = U0, |
| if (Q = U300 and SVRDIR = 1) | then Q = U240 | and SMV = U240, |

C) when a transition occurs on TR2_UP:

| | |
|---|---|
| if (Q = O000) | then SMV = O000, |
| if (Q = O111) | then SMV = O111, |
| if (Q = U0) | then SMV = O000, |
| if (Q = U60) | then SMV = O111, |
| if (Q = U120) | then SMV = O000, |
| if (Q = U180) | then SMV = O111, |
| if (Q = U240) | then SMV = O000, |
| if (Q = U300) | then SMV = O111, |

D) When a transition occurs on TR2_DN:

| | | |
|---|---|---|
| if (Q = O000) | then SMV = O000 | |
| if (Q = O111) | then SMV = O111 | |
| if (Q = U0 and SVRDIR = 0) | then Q = U300 | and SMV = U0, |
| if (Q = U0 and SVRDIR = 1) | then Q = U60 | and SMV = U0, |
| if (Q = U60 and SVRDIR = 0) | then Q = U0 | and SMV = U60, |
| if (Q = U60 and SVRDIR = 1) | then Q = U120 | and SMV = U60, |
| if (Q = U120 and SVRDIR = 0) | then Q = U60 | and SMV = U120, |
| if (Q = U120 and SVRDIR = 1) | then Q = U180 | and SMV = U120, |
| if (Q = U180 and SVRDIR = 0) | then Q = U120 | and SMV = U180, |
| if (Q = U180 and SVRDIR = 1) | then Q = U240 | and SMV = U180, |
| if (Q = U240 and SVRDIR = 0) | then Q = U180 | and SMV = U240, |
| if (Q = U240 and SVRDIR = 1) | then Q = U300 | and SMV = U240, |
| if (Q = U300 and SVRDIR = 0) | then Q = U240 | and SMV = U300, |
| if (Q = U300 and SVRDIR = 1) | then Q = U0 | and SMV = U300, | and

E) when a transition occurs on TR1_DN:

| | |
|---|---|
| if (Q = O000) | then SMV = O000 |
| if (Q = O111) | then SMV = O111 |
| if (Q = U0) | then SMV = U0, |
| if (Q = U60) | then SMV = U60, |
| if (Q = U120) | then SMV = U120, |
| if (Q = U180) | then SMV = U180, |
| if (Q = U240) | then SMV = U240, and |
| if (Q = U300) | then SMV = U300. |

6. A control apparatus as in claim 1, wherein said first activation voltage, said second activation voltage and said third activation voltage are generated such that no overlap occurs with respect to one another.

7. A control apparatus as in claim 1, wherein said counter counts from zero up to a value of one half of $T_p$ and then counts down to zero, for each of said equal time periods $T_p$.

* * * * *